United States Patent
Pau et al.

(10) Patent No.: US 10,901,128 B2
(45) Date of Patent: Jan. 26, 2021

(54) COMPOUND DICHROIC POLARIZERS WITH WAVELENGTH DEPENDENT TRANSMISSION AXES

(71) Applicant: The Arizona Board of Regents on Behalf of the University of Arizona, Tucson, AZ (US)

(72) Inventors: Stanley Pau, Tucson, AZ (US); Russell Chipman, Tucson, AZ (US); Wei-Liang Hsu, Norwalk, CT (US)

(73) Assignee: The Arizona Board of Regents on Behalf of the University of Arizona, Tucson, AZ (US)

( * ) Notice: Subject to any disclaimer, the term of this patent is extended or adjusted under 35 U.S.C. 154(b) by 71 days.

(21) Appl. No.: 15/739,680

(22) PCT Filed: Jun. 24, 2016

(86) PCT No.: PCT/US2016/039400
§ 371 (c)(1),
(2) Date: Dec. 22, 2017

(87) PCT Pub. No.: WO2016/210353
PCT Pub. Date: Dec. 29, 2016

(65) Prior Publication Data
US 2018/0188429 A1    Jul. 5, 2018

Related U.S. Application Data

(60) Provisional application No. 62/185,372, filed on Jun. 26, 2015.

(51) Int. Cl.
*G02B 5/30* (2006.01)
*G02F 1/1335* (2006.01)

(52) U.S. Cl.
CPC ......... *G02B 5/3016* (2013.01); *G02B 5/3008* (2013.01); *G02F 1/133533* (2013.01)

(58) Field of Classification Search
CPC .. G02B 5/3016; G02B 5/3008; G02B 5/3033; G02B 6/0056; G02B 6/02109;
(Continued)

(56) References Cited

U.S. PATENT DOCUMENTS 4,416,514 A * 11/1983 Plummer ............ G02F 1/13473
349/80
4,917,465 A * 4/1990 Conner ............... G02F 1/13473
349/112

(Continued)

OTHER PUBLICATIONS

International Search Report and Written Opinion from International Application No. PCT/US2016/039400, dated Sep. 13, 2016, 8 pages.

(Continued)

*Primary Examiner* — Shan Liu
(74) *Attorney, Agent, or Firm* — Klarquist Sparkman, LLP

(57) ABSTRACT

Compound dichroic polarizers (CDPs) include multiple component dichroic polarizers based on different dichroic dyes and oriented to have different eigenpolarization directions. The component dichroic polarizers can be fixed to each other or to a substrate such as an eyeglass lens. Selection of eigenpolarization orientation and spectrum in a CDP permits color encoding of different SOPs.

24 Claims, 16 Drawing Sheets

(58) Field of Classification Search
CPC .. G02B 5/3025; G02B 5/3058; G02B 5/3083;
G02B 5/3041; G02B 5/3066; G02B
5/305; G02B 5/30; G02B 5/32; G02B
6/278; G02B 6/2746; G02B 6/272; G02B
6/29302; G02B 6/29386; G02B 6/266;
G02B 6/2713; G02B 6/2773; G02B
6/281; G02B 27/283; G02B 27/46; G02B
27/285; G02B 27/286; G02B 27/281;
G02B 27/288; G02B 27/28; G02B
27/145; G02B 1/08; G02F 1/0311; G02F
1/116; G02F 1/1335; G02F 1/133528;
G02F 1/133536; G02F 1/13362; G02F
1/133533; G02F 2001/133531; G02F
2001/133521; G02F 2001/13356; G02F
2001/133538; G02F 2001/133541; G02F
2001/133543; G02F 2001/133545; G02F
2001/133548; G02F 2001/13355; G02F
2001/133562; G02F 2001/133567; G02F
2203/16; G02F 1/0136; G02F 1/09; G02F
1/093; G02F 1/31; G02F 1/133502; G02F
1/13363; G02F 1/133514; G02F 1/0147;
G02F 1/133504; G02F 2001/0139; G02F
2203/48; G02F 2202/40; B29D 11/00644;
B32B 17/10458; B32B 2307/42; H01L
51/5293; H01R 12/7005; H04B 10/532;
G01J 5/0825; G03F 9/7065; G03F
7/70566; G01R 33/3678; C09K 19/0208;
H04J 14/02; G03C 9/04; Y10T 428/1041;
G02C 7/12; H04N 9/3167
USPC .................................................. 349/96–103
See application file for complete search history.

(56) References Cited

U.S. PATENT DOCUMENTS

| | | | | |
|---|---|---|---|---|
| 5,122,887 | A | * | 6/1992 | Mathewson ........ G02F 1/13473 349/180 |
| 5,357,342 | A | * | 10/1994 | Decker .................... G01J 4/00 356/364 |
| 6,233,371 | B1 | | 5/2001 | Kim et al. |
| 2003/0103214 | A1 | | 6/2003 | Vandelden |
| 2007/0177084 | A1 | * | 8/2007 | Ishitani ............. G02F 1/133528 349/117 |
| 2010/0245712 | A1 | * | 9/2010 | Egi .................. G02F 1/133533 349/61 |
| 2012/0075513 | A1 | * | 3/2012 | Chipman ................. G01J 4/04 348/302 |
| 2012/0099413 | A1 | | 4/2012 | Sharp |
| 2012/0105783 | A1 | * | 5/2012 | Pau ........................ C09K 19/38 349/127 |
| 2012/0140323 | A1 | * | 6/2012 | Yajima ............. B29D 11/00644 359/487.02 |
| 2015/0130962 | A1 | * | 5/2015 | Hiramoto ................ G02B 5/30 348/222.1 |
| 2015/0362799 | A1 | * | 12/2015 | Kim .................. G02F 1/133533 349/96 |

OTHER PUBLICATIONS

Myhre et al., "Imaging capability of patterned liquid crystals," *Applied Optics*, 48:6152-6158 (Nov. 10, 2009).
Myhre et al., "Patterned color liquid crystal polymer polarizers," *Optics Express*, 18:27777-27786 (Dec. 20, 2010).
International Preliminary Report on Patentability from International Patent Application No. PCT/US2016/039400, dated Dec. 26, 2017, 7 pages.

* cited by examiner

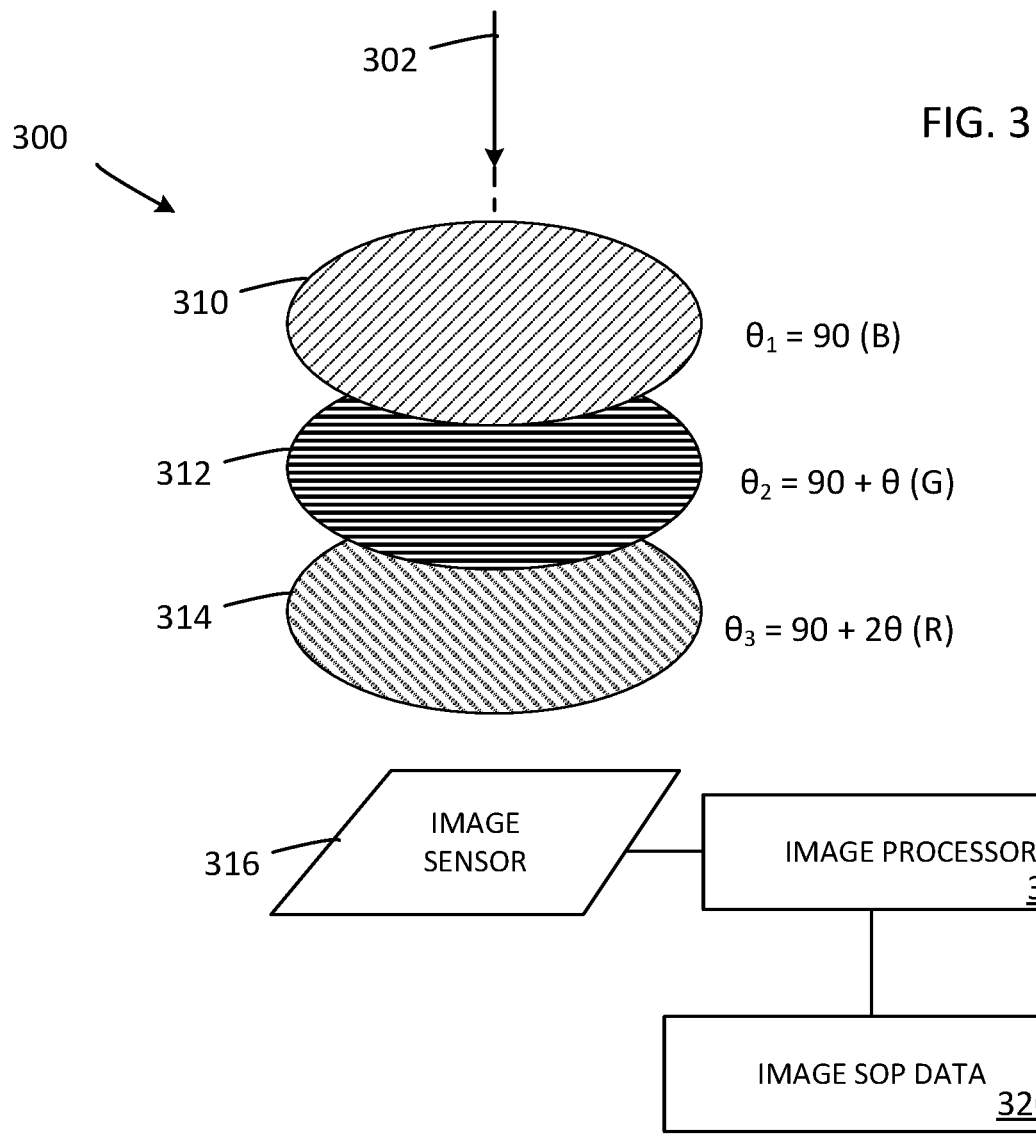

COMPOUND DICHROIC POLARIZERS WITH WAVELENGTH DEPENDENT TRANSMISSION AXES

CROSS-REFERENCE TO RELATED APPLICATIONS

This is the U.S. National Stage of International Application No. PCT/US2016/039400, filed Jun. 24, 2016, which was published in English under PCT Article 21(2), which in turn claims the benefit of U.S. Provisional Application 62/185,372, filed Jun. 26, 2015, which are incorporated herein by reference.

TECHNICAL FIELD

The disclosure pertains to optical polarizers.

BACKGROUND

The detection of states of polarization (SOPs) in optical beams generally requires use of a polarizer. Typical linear sheet polarizers attenuate one eigenpolarization and preferentially transmit an orthogonal eigenpolarization. Such linear polarizers generally are neutral in color, and do not permit estimation of elliptical SOPs or spectral variation in SOP. Accordingly, methods and apparatus are needed that assist in identification of SOP variations in optical beams.

SUMMARY

Polarization devices comprise a plurality of dichroic polarizers, wherein each of the dichroic polarizers has a respective polarization axis, and includes a respective dichroic dye that defines a diattenuation spectrum. Each of the dichroic polarizers of the plurality of dichroic polarizers is situated along an axis arranged in series and has different absorption spectra and different eigenpolarizations. In some examples, the plurality of dichroic polarizers is secured to at least one substrate or each of the dichroic polarizers is secured to a respective substrate. In typical examples, each of the dichroic polarizers of the plurality of dichroic polarizers includes a liquid crystal polymer layer, wherein the dye associated with each of the dichroic polarizers is aligned with respect to respective alignment directions of each of the liquid crystal polymer layers. In some examples, the plurality of dichroic polarizers includes three dichroic polarizers having respective peak transmittances associated with corresponding colors. In some embodiments, the plurality of dichroic polarizers includes three dichroic polarizers having peak transmittances associated with red, green, and blue, respectively. In other examples, the plurality of dichroic polarizers includes three dichroic polarizers having peak transmittances associated with cyan, magenta, and yellow, respectively. In some examples, the plurality of dichroic polarizers is secured to a meniscus lens such as a concave or convex surface of the meniscus lens. In a representative example, the meniscus lens is a multifocal meniscus lens. In still further examples, a rotational stage is coupled to at least one dichroic polarizer of the plurality of dichroic polarizers so that the at least one dichroic polarizer is rotatable about the axis. In other representative embodiments, the rotational stage is adapted to provide a common rotation to each of the dichroic polarizers of the plurality of polarizers. In particular examples, at least one of the polarizers comprises a liquid crystal polymer material with a dichroic dye guest.

Methods comprise positioning a plurality of dichroic polarizers in series so as to receive an input optical beam, wherein at least two of the dichroic polarizers have different nominal absorption spectra and different eigenpolarizations. An input optical beam is directed to the plurality of dichroic polarizers to produce an output optical beam so that a power spectral distribution of the output optical beam is representative of at least one state of polarization of the input optical beam. In some examples, linear polarization angles between the dichroic polarizers are selected so as to achieve a desired variation of diattenuation with wavelength of the at least two polarizers. In further examples, at least one of the dichroic polarizers is rotatable so that the at least one associated eigenpolarization is adjustable, and the at least one associated eigenpolarization is adjusted based on a mapping of states of polarization to colors. In further examples, the linear polarization angles between the dichroic polarizers are selected so as to achieve a desired mapping of states of polarization to colors.

Methods for constructing a device for converting states of polarization of light into color coding comprise preparing a plurality of dichroic polarizers having different absorption spectra and arranging the plurality of dichroic polarizers in series so that light can pass serially therethrough. The dichroic polarizers have respective axes that are oriented so as to establish eigenpolarizations oriented differently from one another. In a typical example, at least one of the dichroic polarizers is situated in a rotational mount so as to vary an associated eigenpolarization orientation. In some examples, the plurality of dichroic polarizers is prepared by mixing one of a plurality of different dyes with a respective quantity of liquid crystal material and aligning the respective liquid crystal molecules in the respective mixtures. The aligned respective mixtures are illuminated with polymerizing light so as to fix the orientation of the respective liquid crystal molecules and the respective dye molecules.

These and other features and aspects of the disclosure are set forth below with reference to the accompanying drawings.

BRIEF DESCRIPTIONS OF THE DRAWINGS

FIG. 3 shows blue (B), green (G), and red (R) dichroic polarizers oriented at 90°, 90+θ°, and 90+2θ°respectively.

DETAILED DESCRIPTION

Figure 1A:
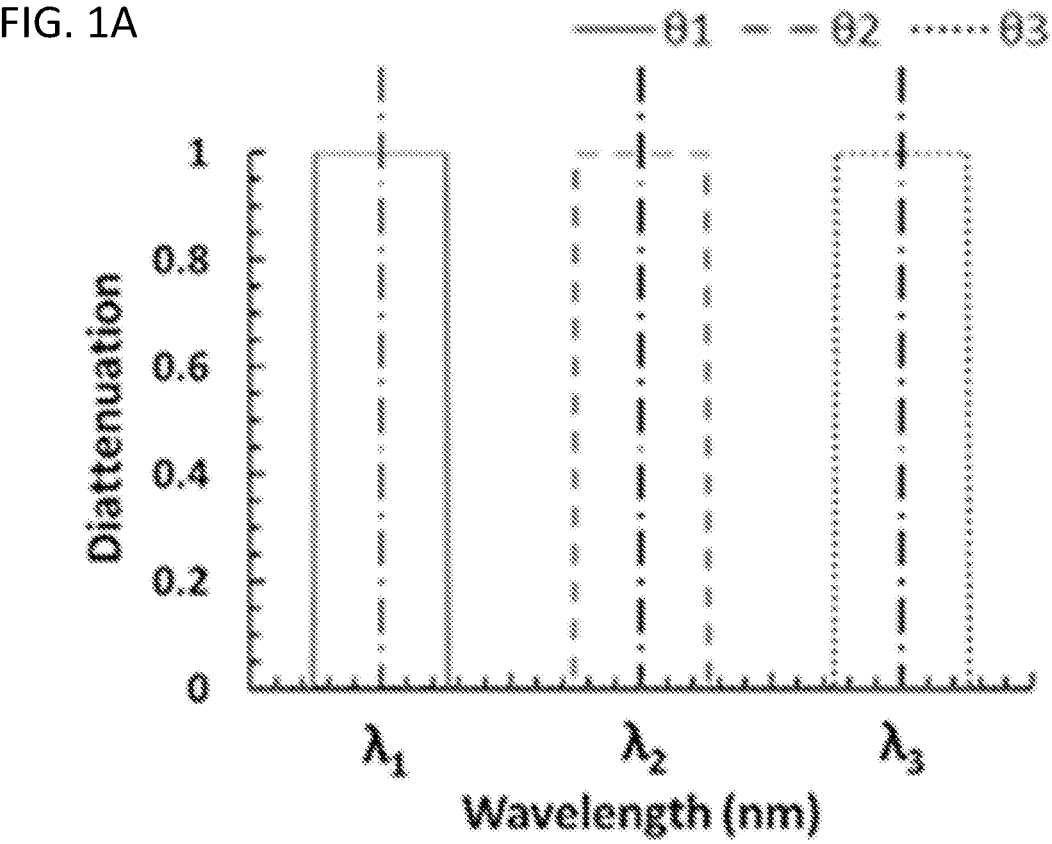
FIG. 1A shows respective spectra of the diattenuation of three ideal absorption-based polarizers which have respective center wavelengths at λ1, λ2, and λ3.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Examples may be described with reference to directions indicated as "above," "below," "upper," "lower," and the like. These terms are used for convenient description, but do not imply any particular spatial orientation. In some examples, optical components are referred to as situated along an axis, but as known to those of ordinary skill, such an axis may be bent, folded, or otherwise arranged, and need not refer to a single line or line segment.

Introduction

Polarizers are optical filters that selectively attenuate polarized light by preferentially transmitting light of one eigen-polarization while attenuating light of another eigen-polarization. In general, polarizers operate by five fundamental mechanisms: absorption, interference, diffraction, Brewster's angle, and birefringence. Depending on the applications, different kinds of polarizers are utilized. Most polarizers, such as those used in imaging, liquid crystal displays, and polarimetry, are broadband polarizers. In contrast, dye based polarizers based on a single dye are generally narrow band, with bandwidth determined by the absorption of the dye. The dispersion of the polarization properties depends on the mechanisms of the polarizers. For example, a wire-grid polarizer, which is based on diffraction, transmits polarized light perpendicular to the wires of the wire grid and has a wide bandwidth covering both the visible and infrared spectrum. On the other hand, an interference-based polarizer, such as a cholesteric liquid crystal polarizer that reflects one circular eigenpolarization by constructive interference, has a narrow bandwidth, around 100 nm in the visible spectrum.

Dichroic polarizers have anisotropic absorption created by dye, liquid crystal polymer, anisotropic molecules, nanowire, nanotube, nanocrystal, microfabricated structures, nanofabricated structures or combinations thereof. In this disclosure, the structure, fabrication, operation and application of compound dichroic polarizers (hereinafter CDPs) using multiple dichroic dyes are described. Instead of mixing dyes in a single layer, a compound dichroic polarizer as disclosed herein is a multi-layer polarizer, wherein some or all layers have different orientations and absorption spectra. By aligning the molecular dipoles of different dyes at different orientations, several wavelength dependent transmission axes designs are presented. Data regarding the dispersion properties of different designs obtained through simulations and experiments are presented. In typical examples, dichroic polarizers are fabricated using one or more dichroic dyes as a guest or guests in a liquid crystal polymer (LCP) host. Photoalignment of an LCP host is achieved using linearly polarized ultraviolet illumination (LPUV) to align a linearly photopolymerizable polymer (LPP) layer, and the alignment orientation is defined by the exposure of LPP to LPUV as described in, for example, Myhre, Sayyad, and Pau, "Patterned color liquid crystal polymer polarizers," Optics Express Vol. 18 (26), pp. 27777-27786 (2010). Representative practical applications for such layered compound dichroic polarizers using multiple dichroic dyes are also described.

For absorption-based polarizers, the dispersion depends on the optical properties of the dichroic materials, and the absorption depends on the orientation angle between the molecular dipole and the direction of polarized light. For some dichroic materials, such as iodine doped polymer utilized in most of commercial thin film polarizers, the bandwidth is as wide as few hundred nanometers. For dichroic dyes, which are utilized in the fabrication of patterned polarizers, the bandwidth is relatively narrow, typically about 100 to 200 nm. To achieve a grey polarizer, multiple dichroic dyes are mixed and applied at the same time.

An ideal polarizer preserves one eigen-polarization and eliminates the other eigenpolarization completely in a certain wavelength band. Examples of eigenpolarization are elliptical, circular and linear polarization states. For an ideal polarizer, the magnitudes of diattenuation and polarizance are one, and the depolarization index is zero. The transmittance or reflectance of the desired eigen-polarization is 100%, and those of the other eigen-polarization are 0%. Different ideal polarizers operate at different wavelengths and cover the spectrum with different bandwidths. FIG. 1A shows the spectra of the diattenuation of three ideal polarizers which center at $\lambda 1$, $\lambda 2$, and $\lambda 3$. The orientation angles of the three polarizers are $\theta 1$, $\theta 2$, and $\theta 3$, respectively.

Figure 1B:
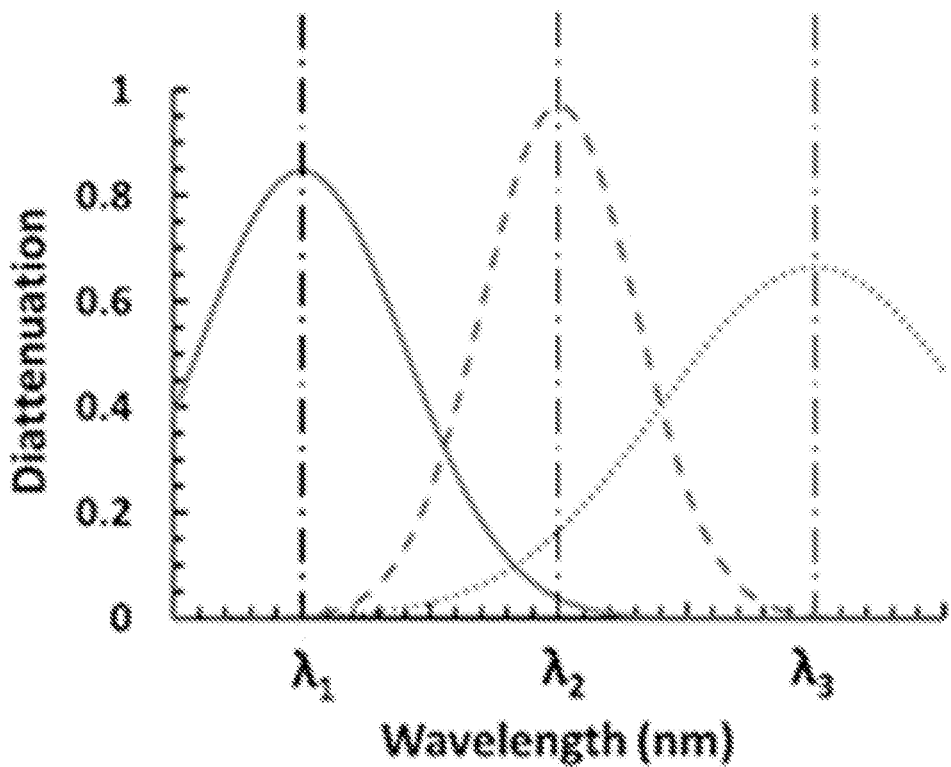
FIG. 1B shows the diattenuation spectra of three real absorption-based polarizers which have the same configuration as FIG. 1(a).

Unlike ideal polarizers, real polarizers cannot diattenuate polarized light perfectly, and the spectra of diattenuation are broad functions instead of boxcar functions. In some cases, the function can be approximated by a Gaussian function, representing an inhomogeneous distribution of optical transitions. For absorption-based polarizers, the magnitudes of diattenuation and polarizance are dependent on the concentration and the absorption of the dichroic material. Higher diattenuation and polarizance require higher concentrations of dichroic material; however, transmittance suffers due to higher light absorption. FIG. 1B shows examples of diattenuation spectra of three absorption-based polarizers made using available dichroic dyes. These realistic polarizers are similar to those associated with the diattenuation spectra of FIG. 1A, but have diattenuations that are less than one and do not have precise spectral boundaries, but vary continuously as a function of wavelength. Such polarizers can be arranged to provide wavelength dependent polarization axes.

As used herein, an eigenpolarization of a polarizer is a state of polarization (SOP) of an input optical beam that is transmitted by the polarizer without changing the SOP. In the disclosed examples, transmissive polarizers are used that have two orthogonal, linear eigenpolarizations. As used herein, an axis of a polarizer is a direction associated with the eigenpolarization having the larger transmittance. In other examples, polarizers can be configured to produce circular or elliptical SOPs and have eigenpolarizations that are circular or elliptical. In still other examples, polarization-division polarizers can be used that produce spatially separated eigenpolarizations. In some cases, polarizers that produce spatially separated eigenpolarizations exhibit the same or similar or the same optical losses; in such cases selection of a polarizer axis can be arbitrary. Representative polarization-division polarizers include polarizing beam splitters and Glan-Thompson beam splitters. Unless otherwise indicated, angles are expressed in degrees. As used herein, light refers to propagating electromagnetic radiation at suitable wavelengths such as ultraviolet, infrared, visible, or other wavelength ranges or combinations thereof. Some examples are described with reference to visible light at wavelengths between about 400 nm and 700 nm, and such light can include red (R), green (G), and blue (B) components or other components. As used herein, non-parallel axes refers to axes that are at angles that are at least 1, 5, 10, 15, or 25 degrees with respect to each other.

Polarizer fabrication using guest host materials is described in the embodiments below, but polarizers can be made in other ways such as dip coating, incorporating dye into stretched substrates, or in other ways. Typical examples used aligned dichroic dyes, but in other examples, other structures such as metallic wires or elongated metallic particles can be similarly aligned. One or more polarizers can also be a so-called neutral polarizer, having a gray or other color neutral appearance.

A compound dichroic polarizer (CDP) comprises multiple dichroic dye polarizers (DDPs) which are typically fabricated using dichroic dye as a guest in a liquid crystal polymer (LCP) host. Each DDP has a nominal absorption spectrum which is different for at least two of the DDPs. The DDPs are arranged in series so that light propagates through them sequentially and the orientation angles of the polarization eigenaxis of at least two of the DDPs are different. Because of the variation of orientation angles of individual layers, a compound dichroic polarizer has a wavelength dependent polarization signature, such as linear diattenuation, circular diattenuation, and diattenuation orientation. The interaction between the absorption of dichroic dye molecular dipole and the birefringence of the LCP host forms optical devices with sophisticated polarization signatures. The compound dichroic polarizers can convert polarization signatures into color coding in unique predesigned ways. Some examples are described in the format RGB70-100, wherein R denotes a red dye, G denotes a green dye, B denotes a blue dye and the numerals 70-100 denote a range of orientation angles. Such CDPs typically exhibit noticeable diattenuation orientation discontinuities at intermediate wavelengths among the absorption peaks of the dichroic dyes. The complicated polarization signatures can be represented using diattenuation spectra, Muller matrix spectra, and evolution over the Poincaré sphere.

In typical examples, partially or completely polarized light is color encoded by interaction with the polarization devices disclosed herein. For convenience, in some cases, red is associated with wavelengths of about 700-635 nm, orange about 635-590 nm, yellow about 590-560 nm, green about 560 nm to 520 nm, cyan about 520 nm to 490 nm, blue abut 490-450 nm, violet about 450-400 nm.

Polarizers with Wavelength Dependent Transmission Axes

FIG. 1A shows diattenuation spectra of three ideal polarizers which polarize in wavelength bands centered at $\lambda 1$, $\lambda 2$, and $\lambda 3$. The diattenuation ranges from 0 to 1 indicating that one eigenpolarization is 100% transmitted and the other eigenpolarization is completely attenuated. The orientation angles of the axes of the three polarizers are $\theta 1$, $\theta 2$, and $\theta 3$, respectively, and are independently selectable.

Figure 2A:
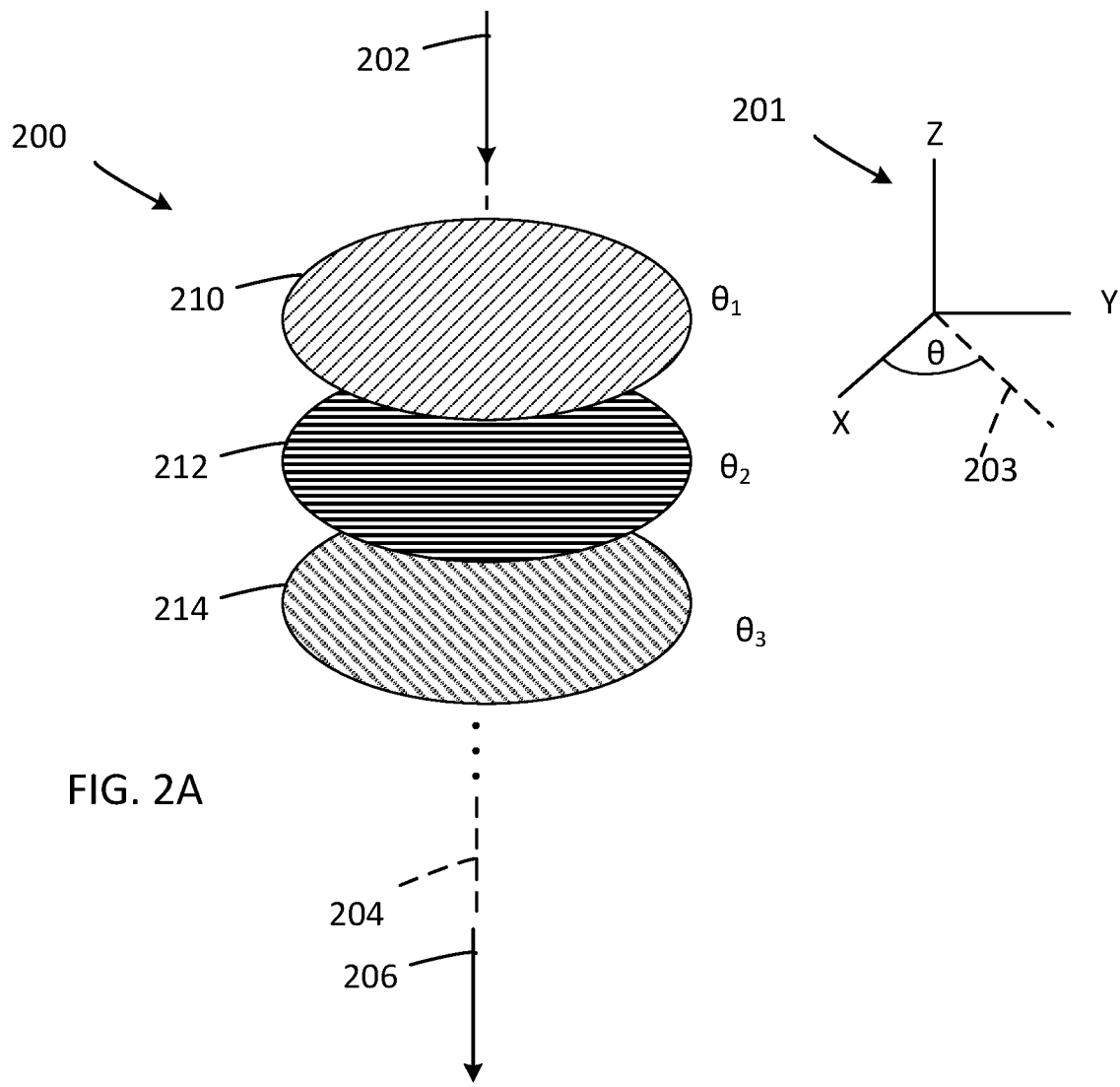
FIG. 2A shows an example of the relative eigen axis angles of a compound dichroic polarizer (CDP) composed of multiple dichroic dye polarizers.

FIG. 2A shows a representative compound dichroic polarizer (CDP) 200 having wavelength dependent transmission axes. The CDP 200 includes dichroic polarizers 210, 212, 214 (referred to in some cases as "component polarizers") that are situated along an axis 204. An input optical beam 202 is directed along the axis 204 and an output beam 206 has a wavelength dependent state of polarization (SOP). Additional or fewer dichroic polarizers can be included, and three dichroic polarizers embodiment shown in FIG. 2A is only a representative example of a CDP. Each of the dichroic polarizers 210, 212, 214 has a polarization axis arranged at respective angles θ1, θ2, and θ3 that can be described with reference to an XYZ-coordinate system 201 that shows a polarization axis 203 at an angle θ indicating an orientation of a selected eigenpolarization.

Figure 2B:
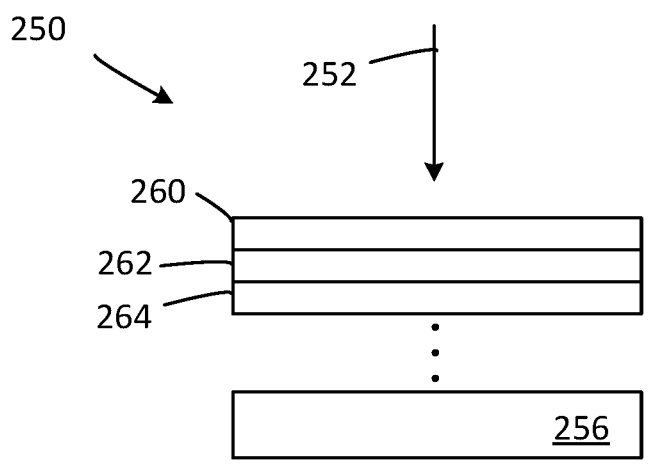
FIG. 2B shows multiple dichroic dye polarizers such as shown in FIG. 2A fabricated as individual thin film layers stacked on a substrate to form a thin film compound dichroic polarizer.

FIG. 2B illustrates a representative CDP 250 that includes dichroic polarizers 260, 262, 264 that are situated on a substrate 256. As shown in FIG. 2B, the CDP 250 is situated to receive an input beam 252 that is directed so as to interact with the dichroic polarizers 260, 262, 264 in series, beginning with the dichroic polarizer 260. The input beam can also be directed so as to interact with the dichroic polarizers 260, 262, 264 in series, beginning with the dichroic polarizer 264. Additional dichroic polarizers can be provided as well. The dichroic polarizers 260, 262, 264 have associated diattenuation spectra and polarization axes, and the orientations of the polarization axes are independently selectable at angles θ1, θ2, and θ3. The dichroic polarizers 260, 262, 264 can be fabricated as an individual thin film layers on the substrate 256, or formed and then secured to the substrate 256. Alternatively, each can be formed on a respective substrate, and then all secured together to form a CDP. In addition, one or more dichroic polarizers (or polarizing films) can be situated on both sides of a substrate, and need not be on a common side as shown in FIG. 2B. Because of the variation of orientation angles of individual layers/polarizers, the CDP 250 has a wavelength dependent transmission axis.

Representative Materials and Fabrication Methods

For purposes of illustration, representative examples of the disclosed devices were fabricated. Materials for the example LCPs were used as received from suppliers. For dichroic material, three dichroic dyes, G-207 (415 nm), G-241 (580 nm), and G-472 (640 nm) were purchased from Hayashibara Biochemical Laboratories, Inc. of New York, N.Y. The peak absorption is denoted in parentheses. The dichroic dyes were used as a guest in an LCP host to fabricate the dichroic dye polarizers. The LCP material was RMM141C, a dry powder manufactured by EMD Chemicals of Philadelphia Pa. and added to chloroform at a 30% weight-to-weight ratio as host solution. Then 25 mg/ml G-207, 30 mg/ml G-241, and 30 mg/ml G-472 dichroic dye mixtures were prepared using the LCP host solution. Photoalignment of the LCP is achieved using linearly polarized ultraviolet light (LPUV) to align a linearly photopolymerizable polymer (LPP), in these examples, ROP-108 supplied by Rolic Technologies Ltd. of Allschwil, Switzerland. After forming an aligned LPP layer, LCP solutions were coated onto the aligned LPP layers. The LCP aligns to the LPP alignment. Since the LCP is a reactive mesogen, it can be permanently fixed in the liquid crystal phase by ultraviolet (UV) illumination and a durable thin film dichroic dye polarizer can be formed thereafter. The fabrication processes of dichroic dye polarizers are described in detail in Myhre, Sayyad, and Pau, "Patterned color liquid crystal polymer polarizers," Opt. Express 18, 27777-27786 (2010) and Myhre and Pau, "Imaging capability of patterned liquid crystals," Appl. Opt. 48, 6152-6158 (2009).

In some examples, intermediate layers are provided between dichroic polarizers layers so that LPP/LCP alignment of one layer does not result in similar alignment of an adjacent layer so that polarizer axes remain independently selectable. A glass, plastic or other substrate can be used, or a coating such as a layer of a cured optical epoxy can be used for separation.

Dichroic Polarizers

G-207, G-241, and G-472 dichroic dyes are yellow, purple, and blue dyes. Therefore, in terms of the absorption, which is a function of frequency of visible light, a G-207 dichroic dye polarizer acts as a low-pass filter; a G-241 dichroic dye polarizer acts as a band-pass filter; and a G-472 dichroic dye polarizer acts as a high-pass filter. However, in terms of polarization properties, a G-207 dichroic dye polarizer diattenuates light of high frequencies (blue light); a G-241 dye dichroic polarizer diattenuates light of intermediate frequencies (green light); a G-472 dye dichroic polarizer diattenuates light of low frequencies (red light). Thus, as used herein, G-207, G-241, and G-472 based dichroic dye polarizers are referred as blue (B), green (G), and red (R) polarizers, respectively. FIG. 3 illustrates a CDP 300 based on these dyes that includes a blue dichroic polarizer 310, a green dichroic polarizer 312, and a red dichroic polarizer 314 having polarization axes oriented at respective angles θ1=90, θ2=90+θ, and θ3=90+20. The angle θ is an included angle between the polarization axes of the blue dichroic polarizer 310 and the green dichroic polarizer 312 and is variable to achieve a large or otherwise selected polarization dispersion.

A color image sensor 316 is situated to receive an image optical beam from the CDP 300 and an image processor 318 stores a representation of the received image beam in a memory device 320 and to obtain SOP data associated with the image optical beam.

Figure 4A:
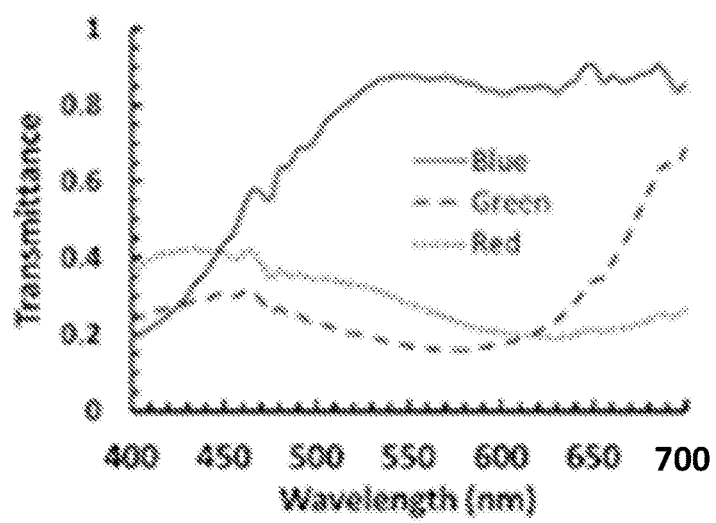
FIGS. 4A-4C shows transmittance, diattenuation, and retardance spectra, respectively, of the blue, green, and red dichroic polarizers of FIG. 3.
Figure 4B:
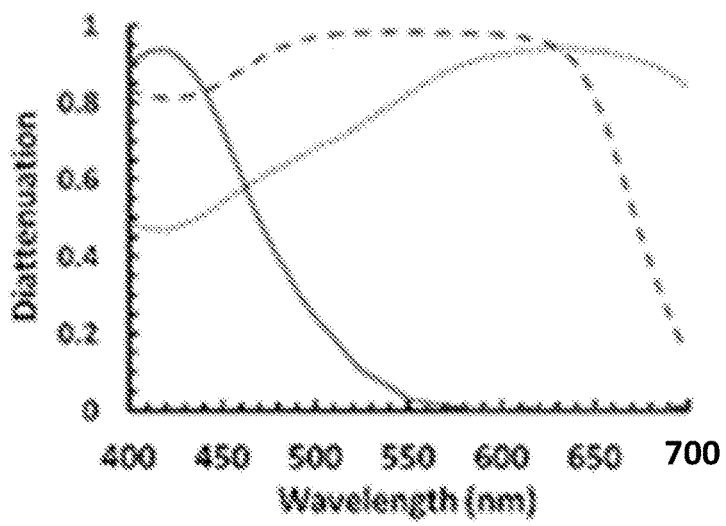
Figure 4C:
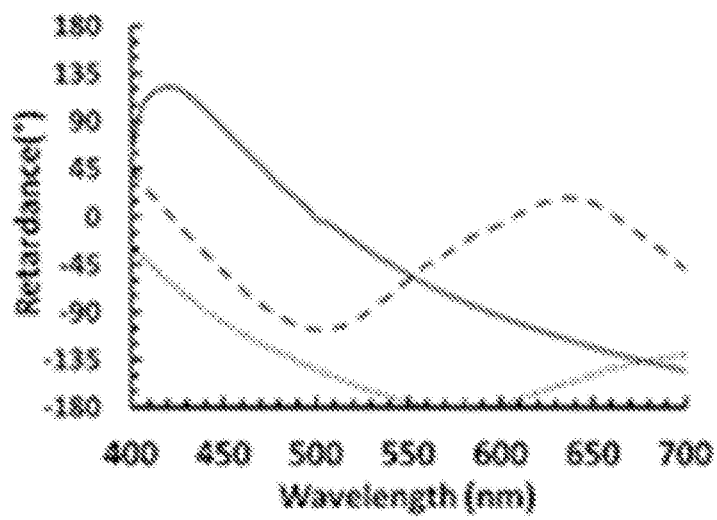

Blue, green, and red dichroic polarizers are shown in FIG. 3, oriented at 90°, 90°+θ, and 90°+2θ, but other orientations may be used. The three polarizers 310, 312, 314 were measured using a calibrated Mueller matrix imaging polarimeter, and the transmittance, diattenuation, and retardance spectra are derived as shown in FIGS. 4A-4C. FIGS. 4A-4B show how blue, green, and red polarizers absorb and diattenuate the light correspondingly. The minimum transmittance happens at a selectable wavelength since one eigenpolarization exhibits a maximum absorption. On the other hand, as shown in FIG. 4C, the polarizers also act as retarders because the LCP host provides retardance. In addition, G-241 dichroic dye shows a strong birefringence around the designed wavelength which leads to an increase of retardance as wavelength increases.

Figure 5:
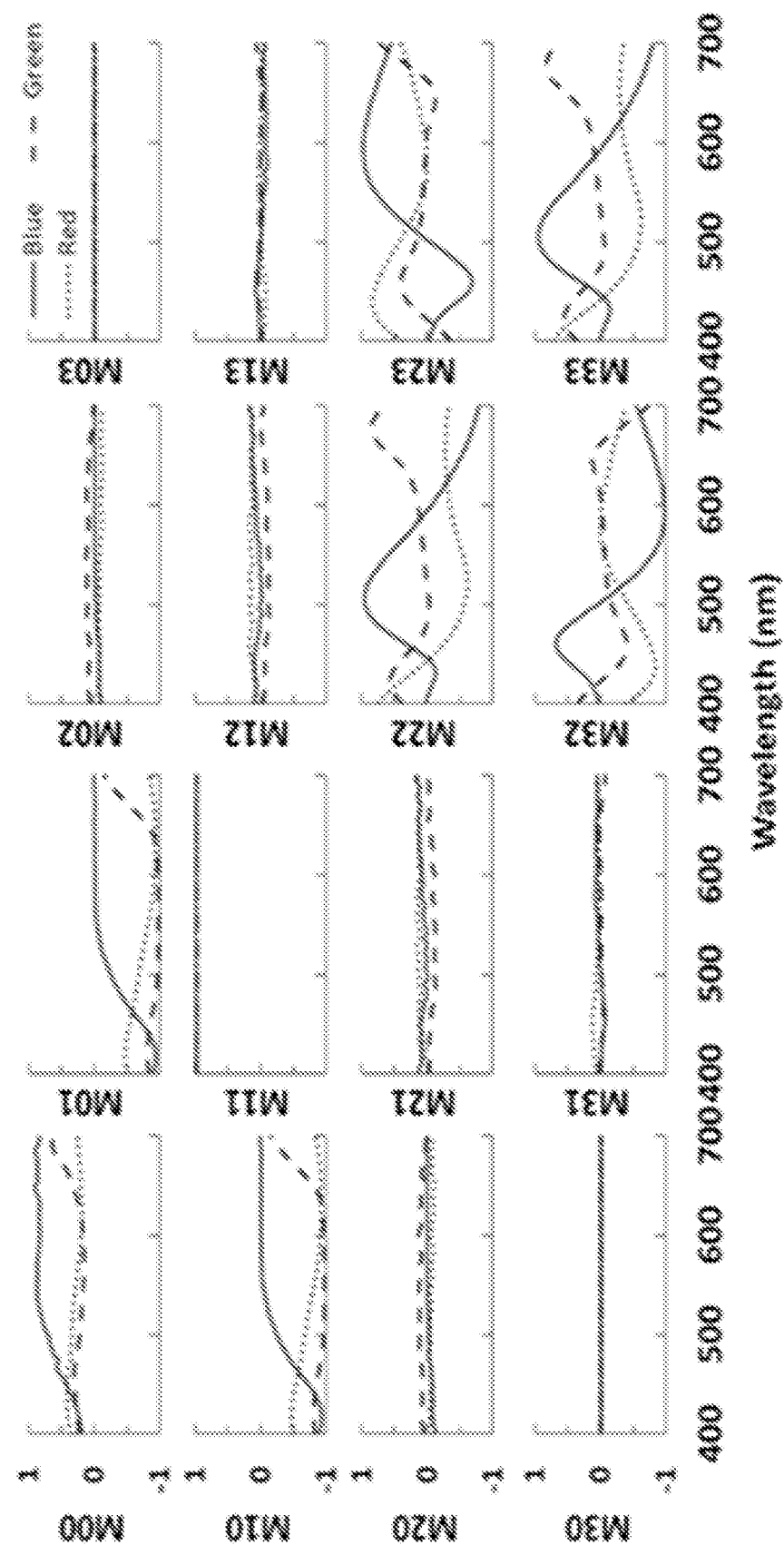
FIG. 5 shows normalized Mueller matrix spectra of the blue, green, and red dichroic polarizers of FIG. 3.

Measured and normalized Mueller matrix spectra of the polarizers 310, 312, 314 are shown in FIG. 5. The data show that the polarizers are primarily linear polarization devices with a small circular polarization signature. By using Lu-Chipman decomposition, depolarization indices of these samples are deduced to be smaller than 0.025, which implies satisfactory alignment among LPP, LCP, and dichroic dyes. In FIG. 5, Mueller matrix elements $M_{IJ}$ are denoted $M_{I,J}$, for I, J=0, 1, 2, 3

Compound Dichroic Polarizers (CDPs)

As discussed in the previous section, the compound dichroic polarizers disclosed herein comprise (in one example) one each of three different dichroic dye polarizers, or one each of two or more different dichroic dye polarizers. Measured Mueller matrix spectra of individual polarizers are used to compute the dispersion of the compound dichroic polarizers. Since the compound dichroic polarizers are inhomogeneous polarization devices, the dispersion of the polarization properties depends on an order of the dichroic dye polarizers. In a CDP with R, G, and B polarizers such as illustrated above, six different configurations, RGB, RBG, GRB, GBR, BRG, and BGR were simulated and measured with different included angles θ. For example, RGB with a θ=40° (RGB40) refers to the configuration which incoming light passes through the blue, green, and red polarizers in sequence, and θ is equal to 40°. The Mueller matrix spectra computation is shown as follows:

$$M_{RGB}(\lambda, \theta=40°) = M_R(\lambda, 170°) M_G(\lambda, 130°) M_B(\lambda, 90°)$$

wherein $M_{RGB}(\lambda)$ is the resultant Mueller matrix spectra. $M_R(\lambda, 170°)$ is the Mueller matrix spectra of the red polarizer oriented at 170°; $M_G(\lambda, 130°)$ is the Mueller matrix spectra of the green polarizer oriented at 130°; and $M_B(\lambda, 90°)$ is the Mueller matrix spectra of blue polarizer oriented at 90°. The naming of the configurations follows the mathematical order of the Mueller matrix multiplication.

Figure 6A:
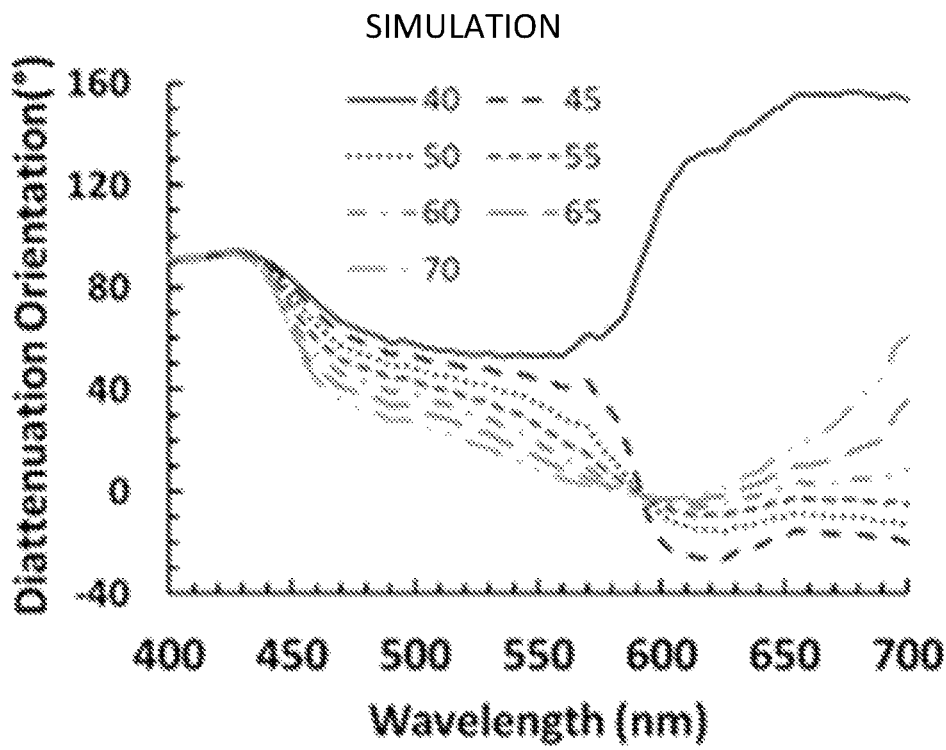
FIGS. 6A-6B show simulation and measurements, respectively, of the wavelength dependent diattenuation orientation of the RGB configuration of FIG. 3, wherein θ ranges from 40° to 70°.
Figure 6B:
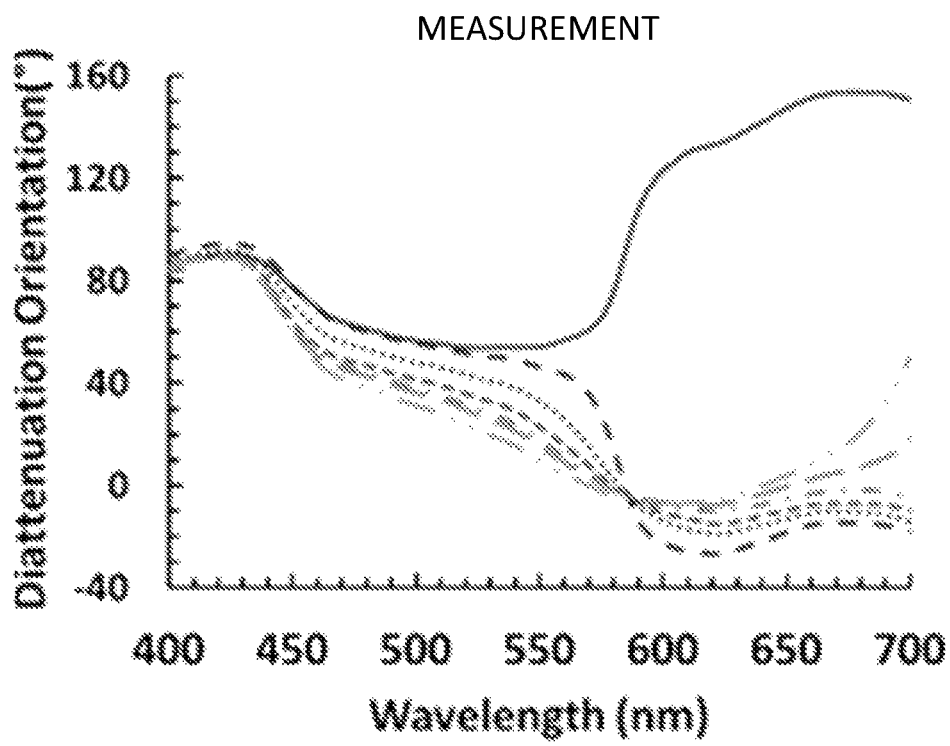

Among the results of all the simulation, three sets of configurations, RGB40-70, RGB70-100, and GRB25-55 are compared with the Mueller matrix measurements because of their large dispersions of polarization properties, especially diattenuation orientations. FIGS. 6A-6B show simulations and measurements of the wavelength dependent diattenuation orientation of the RGB configuration with θ ranging from 40° to 70°. These results of FIGS. 6A-6B are consistent with each other. Among these configurations, RGB60 is a good example with a continuously varying diattenuation orientation between 450 nm and 600 nm.

Figure 7A:
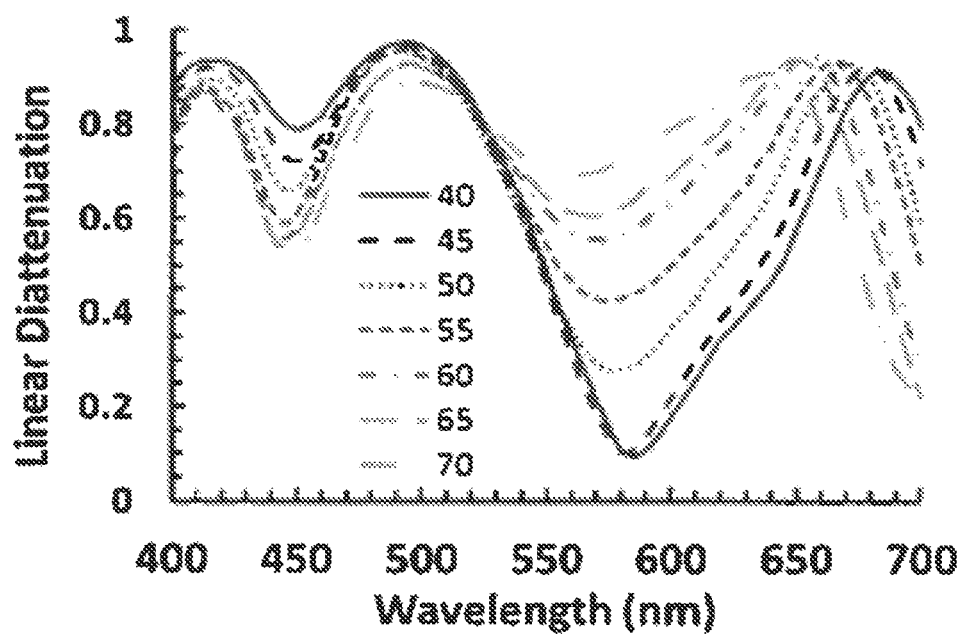
FIGS. 7A-7B show measured results of wavelength dependent linear and circular diattenuation orientation of the RGB configuration of FIG. 3, wherein θ ranges from 40° to 70°.
Figure 7B:
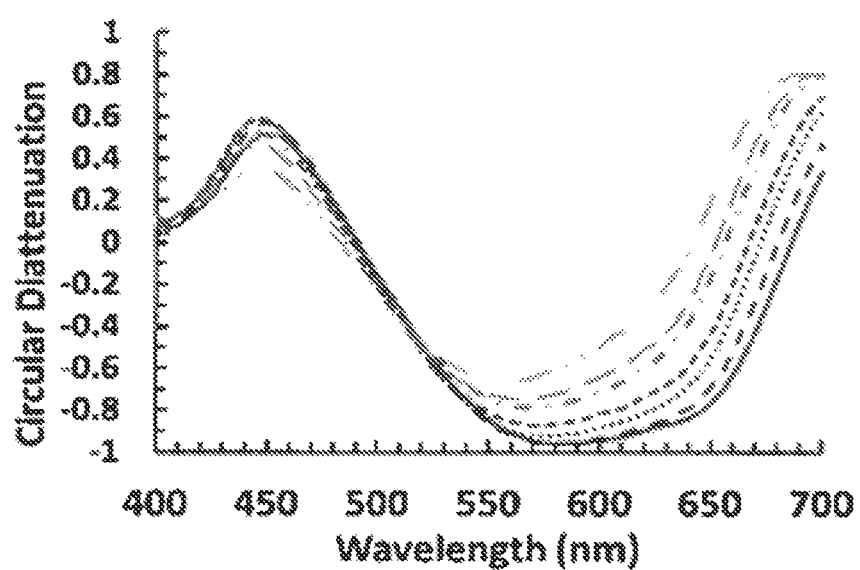

FIGS. 7A-7B show measurements of wavelength dependent linear and circular diattenuation, respectively, of an RGB configuration with θ ranging from 40° to 70°. The simulation and measurement results are consistent with each other. For linear diattenuation, there are two local minimums in the visible spectrum as shown in FIG. 7A at intermediate wavelengths among the absorption peaks of the three dichroic dyes. For the circular diattenuation, as shown in FIG. 7B, the magnitude ranges across the visible band due to the retardance dispersion of the LCP. The interaction between linear diattenuation and linear retardance results in high magnitudes of circular diattenuation around the corresponding linear diattenuation minimums.

Figure 8A:
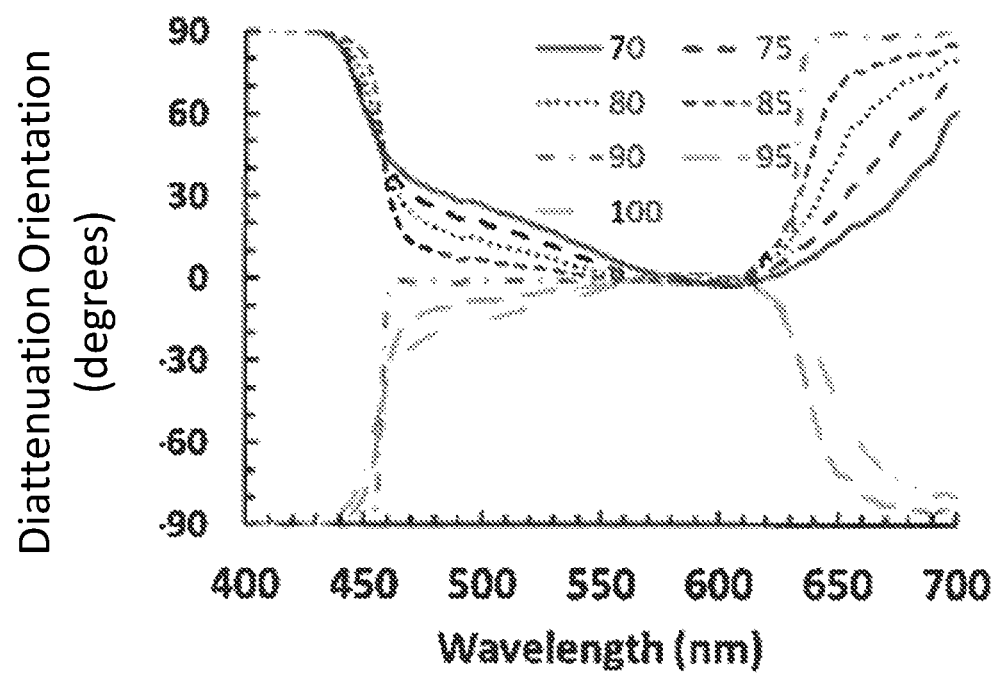
FIGS. 8A-8B show simulated and measured results of the wavelength dependent diattenuation orientation of the RGB configuration of FIG. 3, wherein θ ranges from 70° to 100°.
Figure 8B:
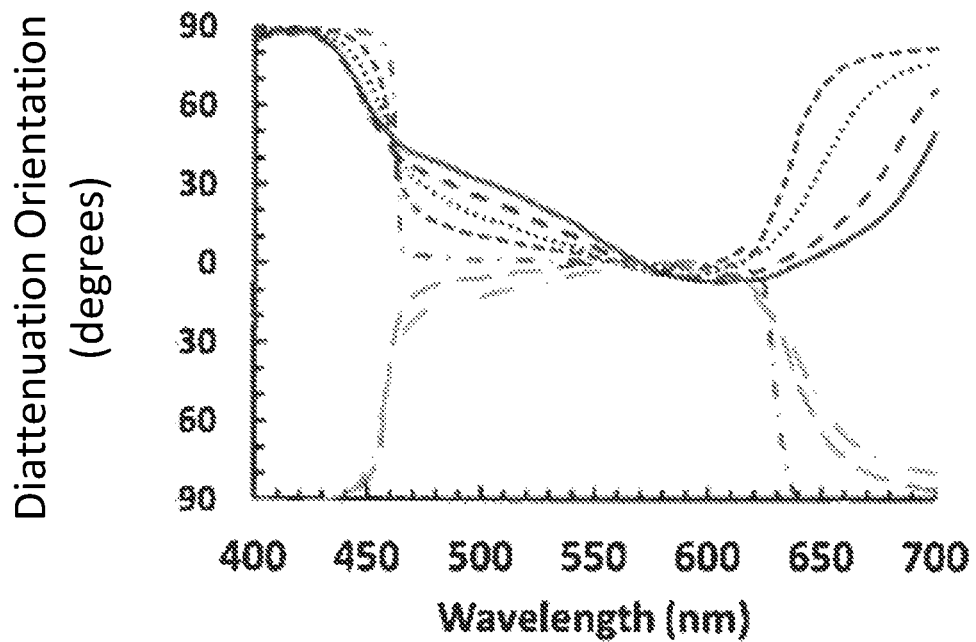

FIGS. 8A-8B shows simulation and measured results of the wavelength dependent diattenuation orientation of an RGB configuration with θ from 70° to 100°. There are noticeable discontinuities at the intermediate wavelengths among the absorption peaks of the three dichroic dyes due to the nearly orthogonal included angles. The linear diattenuation from orthogonal polarizers nullifies each other at the intermediate wavelength, and the diattenuation orientation is altered back and forth between the angles of the polarizers' orientation. The simulation and measurement results are consistent and both show the same behavior. Among these configurations, RGB90, where polarizers are exactly perpendicular to each other, is a good example with the discontinuities.

Figure 9A:
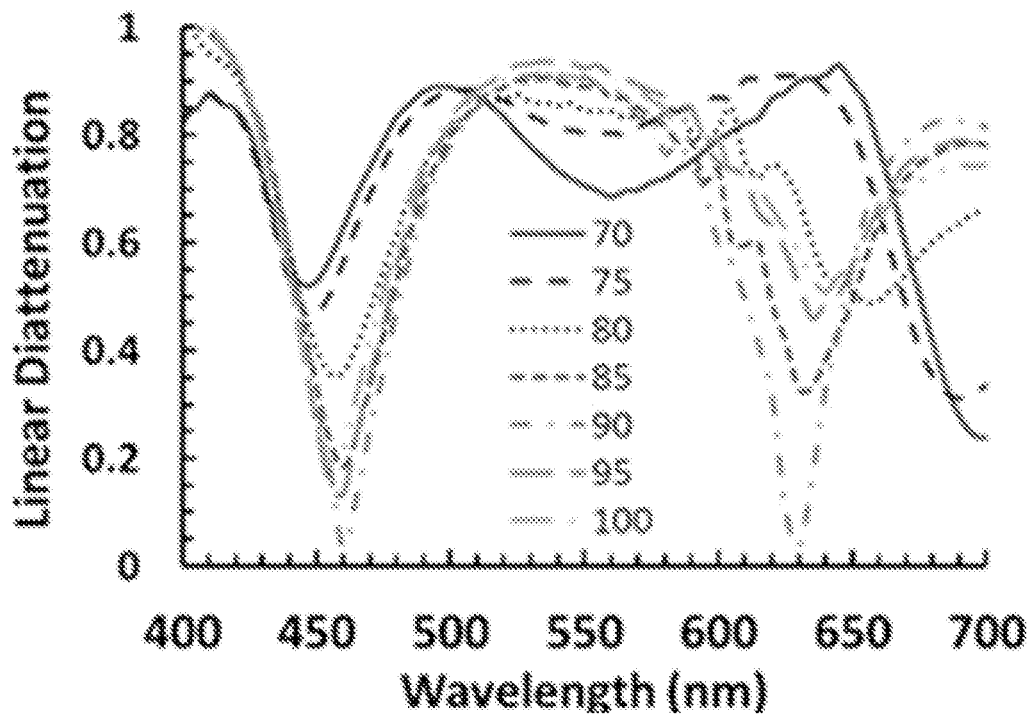
FIGS. 9A-9B show measured wavelength dependent linear and circular diattenuation of the RGB configuration of FIG. 3, wherein θ ranges from 70° to 100°.
Figure 9B:
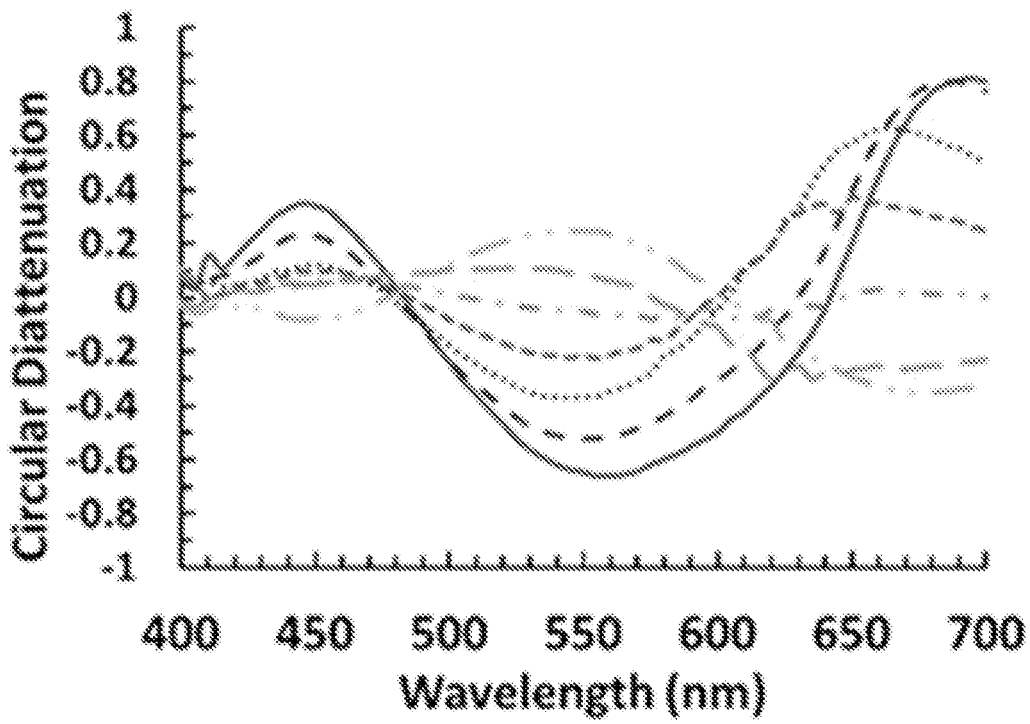

FIG. 9A-9B show measured results of the wavelength dependent linear and circular diattenuation, respectively, of an RGB configuration with θ ranging from 70° to 100°. Since the linear diattenuation from orthogonal polarizers voids each other, there are local minimums happening at the intermediate wavelength as shown in FIG. 9A. For RGB90, the magnitudes of the two local minimums of linear diattenuation are zero. For circular diattenuation, as shown in FIG. 9B, the magnitude ranges across the visible band due to the LCP retardation.

Figure 10A:
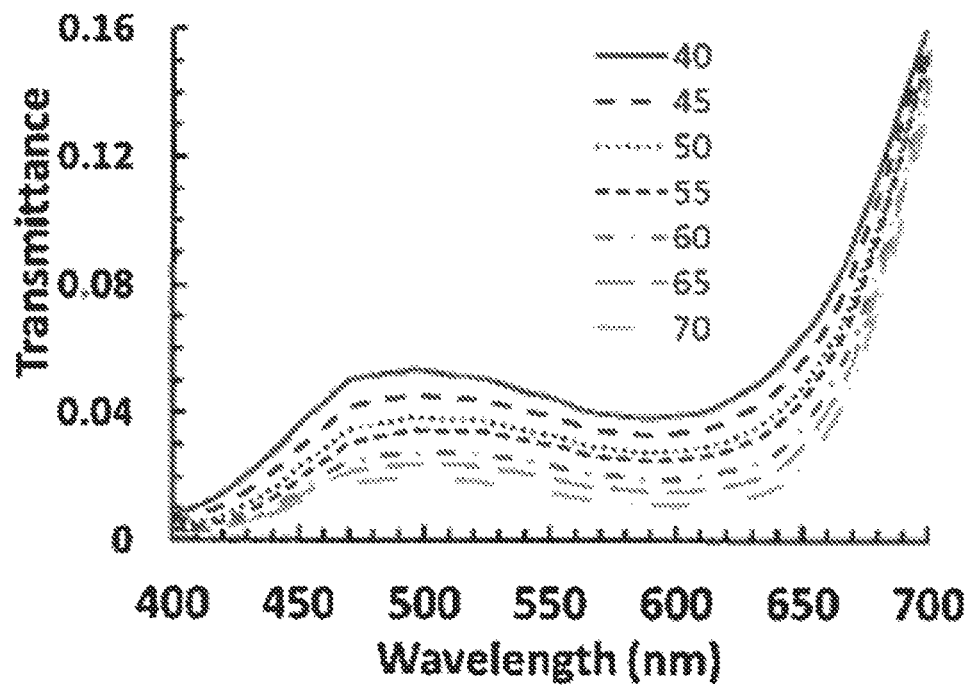
FIGS. 10A-10B show measured wavelength dependent transmittance of the RGB configuration of FIG. 3, wherein θ ranges from 40° to 70° and 70 to 100°, respectively.
Figure 10B:
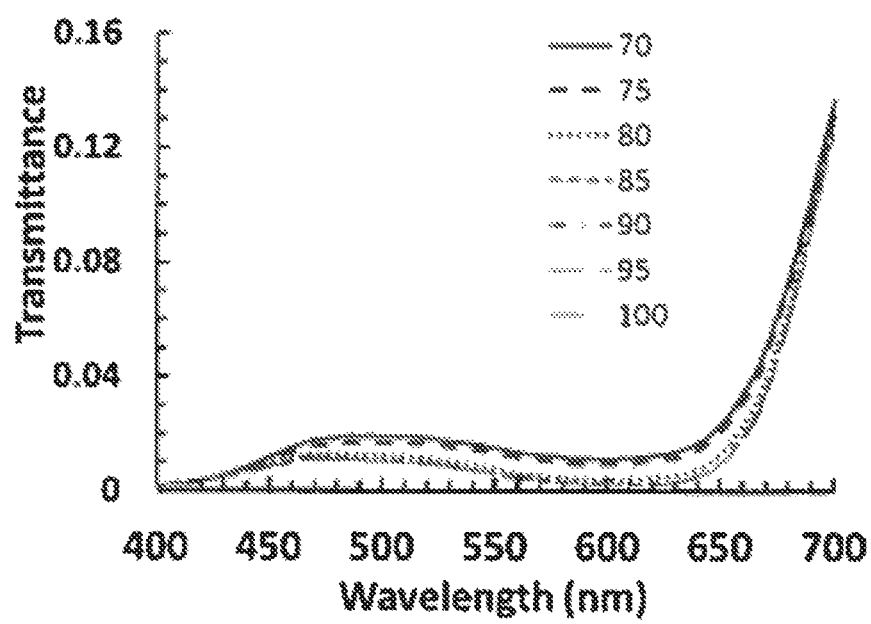

FIGS. 10A-10B show experimental results of the wavelength dependent transmittance of an RGB configuration with θ ranging from 40° to 70° and from 70° to 100°, respectively. FIG. 10A shows the transmittance spectra of RGB40-70, and the transmittance decreases as the included angle increases. This is because the linear diattenuation from the polarizers not only voids each other's diattenuation but also absorbs orthogonally polarized states of light. FIG. 10B shows the transmittance spectra of RGB70-100, showing that RGB90 absorbs most of the light where the transmittance is smaller than 1.5% between 400 nm and 650 nm.

Figure 11A:
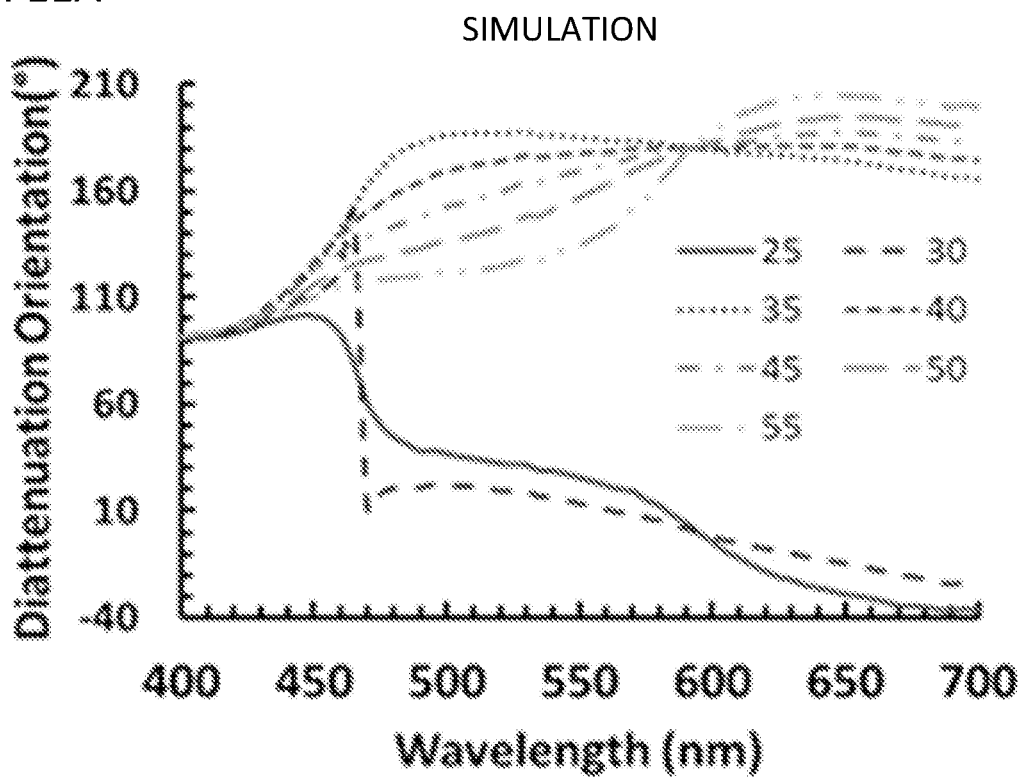
FIGS. 11A-11B show simulated and measured wavelength dependent diattenuation orientations of the GRB configuration of FIG. 3, wherein θ ranges from 25° to 55°.
Figure 11B:
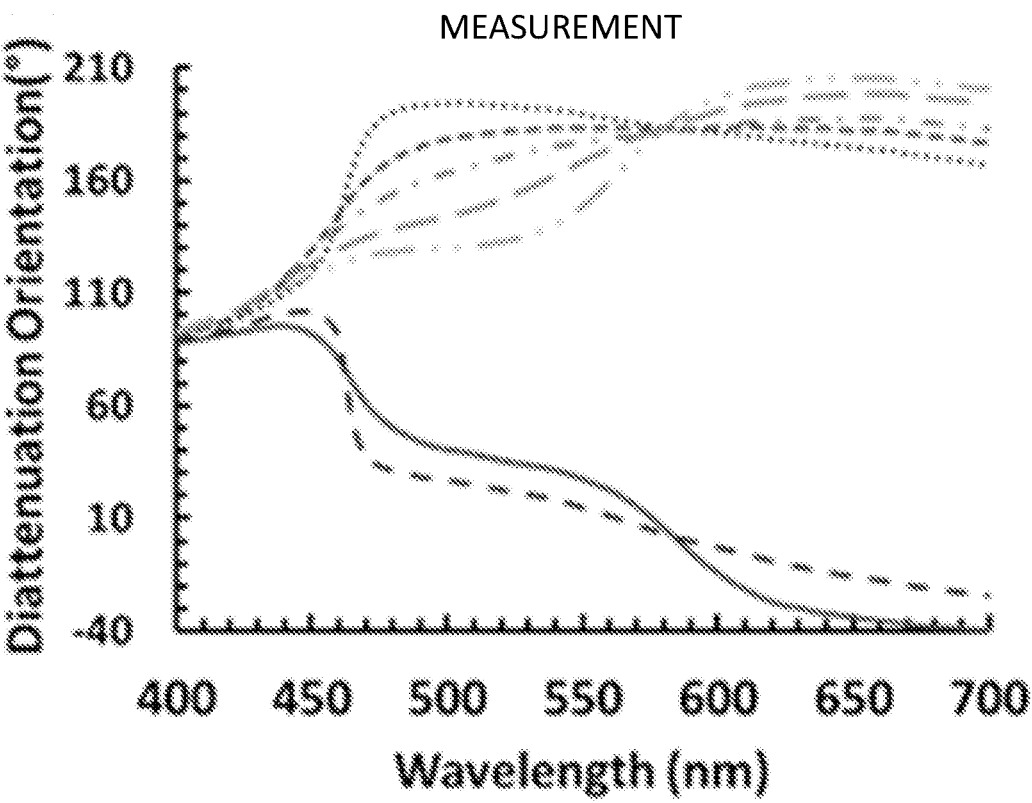
Figure 12A:
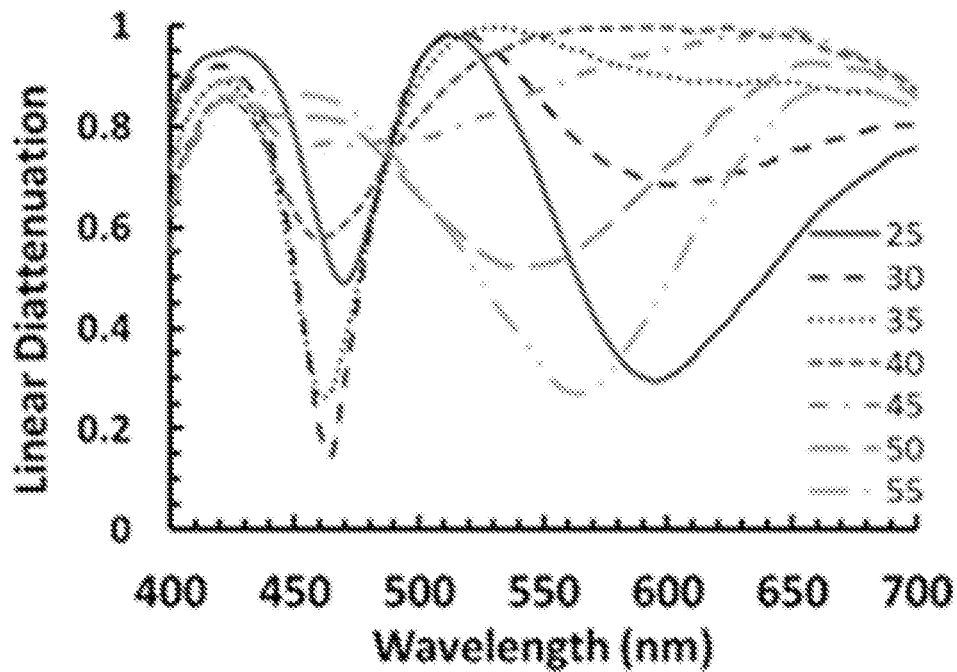
FIGS. 12A-12B show measured wavelength dependent linear and circular diattenuations of the GRB configuration of FIG. 3, wherein θ ranges from 25° to 55°.
Figure 12B:
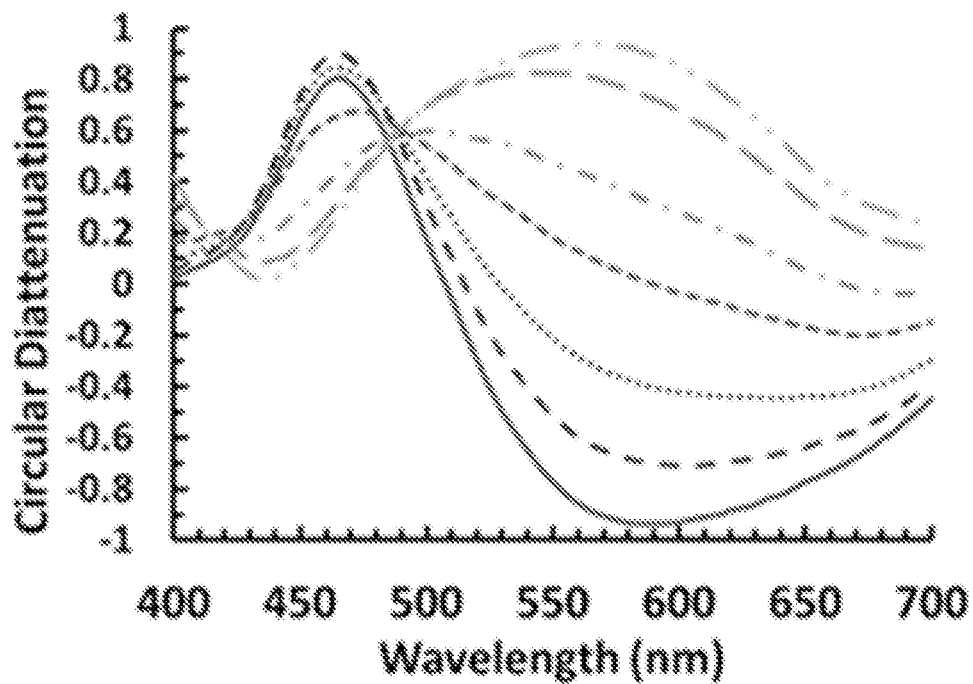

FIGS. 11A-12B show additional examples of GRB25-55 configurations. FIGS. 11A-11B show simulation and measurements, respectively, of the wavelength dependent diattenuation orientation of the GRB configuration with θ ranging from 25° to 55°. FIGS. 12A-12B show experimental results of wavelength dependent linear and circular diattenuation, respectively, of a GRB configuration with θ ranging from 25° to 55°. Similar to the other examples, the simulation and measurement results agree with each other. The diattenuation orientation ranges continuously between 400 nm and 600 nm. Different from RGB40-70, the angle of diattenuation orientation increases as wavelength increases. Different patterns of diattenuation orientation can be achieved using different configurations and concentrations of dichroic dyes.

Figure 13:
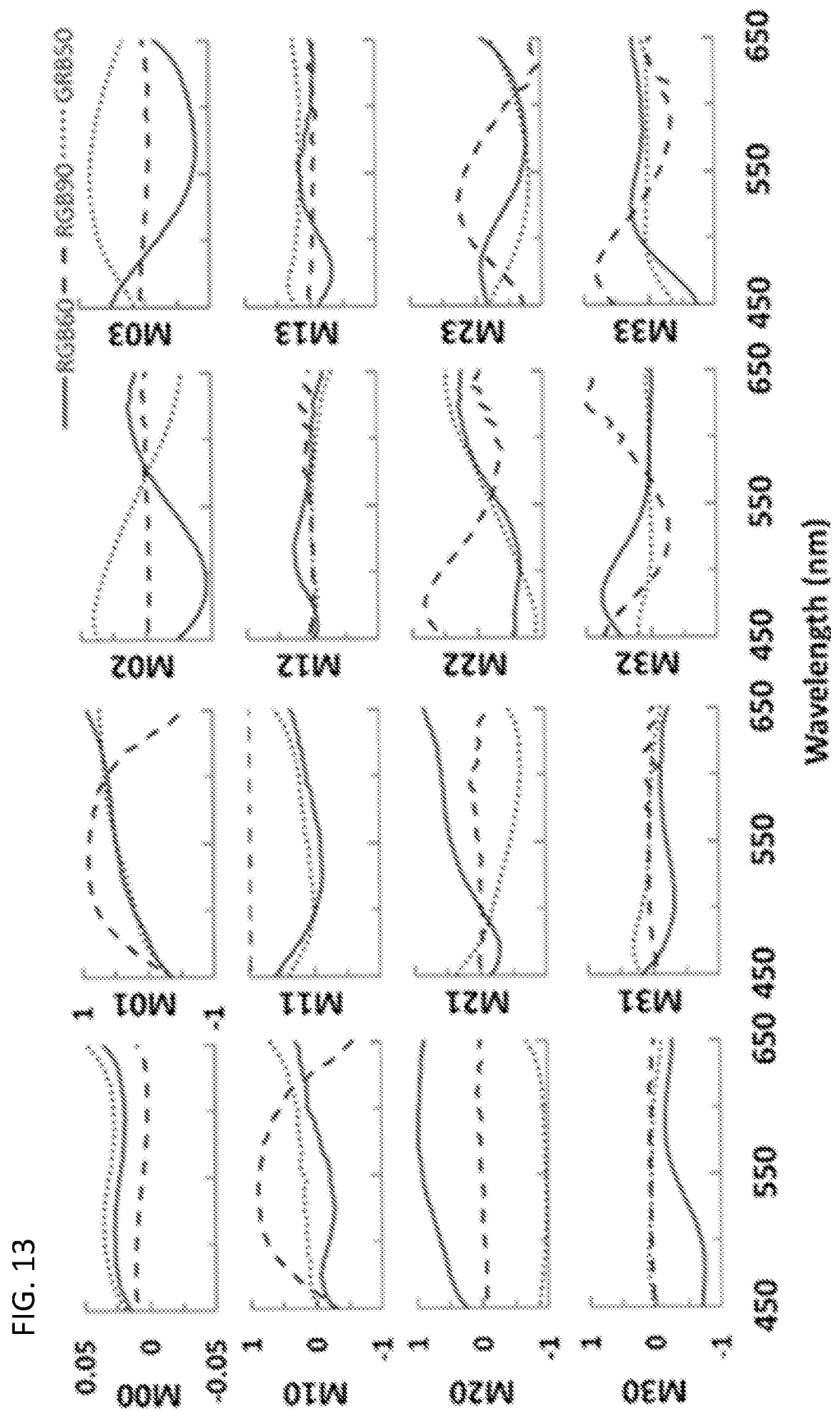
FIG. 13 shows normalized Mueller matrix spectra of RGB60, RGB90, and GRB50 compound dichroic filter configurations, respectively, wherein R denotes a red dye, G denotes a green dye, B denotes a blue dye and the numbers 60, 90 and 50 are the orientation angles of the filters in degrees.

The normalized Mueller matrix spectra of three chosen configurations, RGB60, RGB90, and GRB50, are measured and shown in FIG. 13. Small magnitudes of M00 indicate a large absorption from these configurations. On the other hand, CDPs are neither pure polarizers nor retarders. The interaction between dichroic dyes and the LCP layer forms optical devices with complex reproducible polarization signatures.

Figure 14:
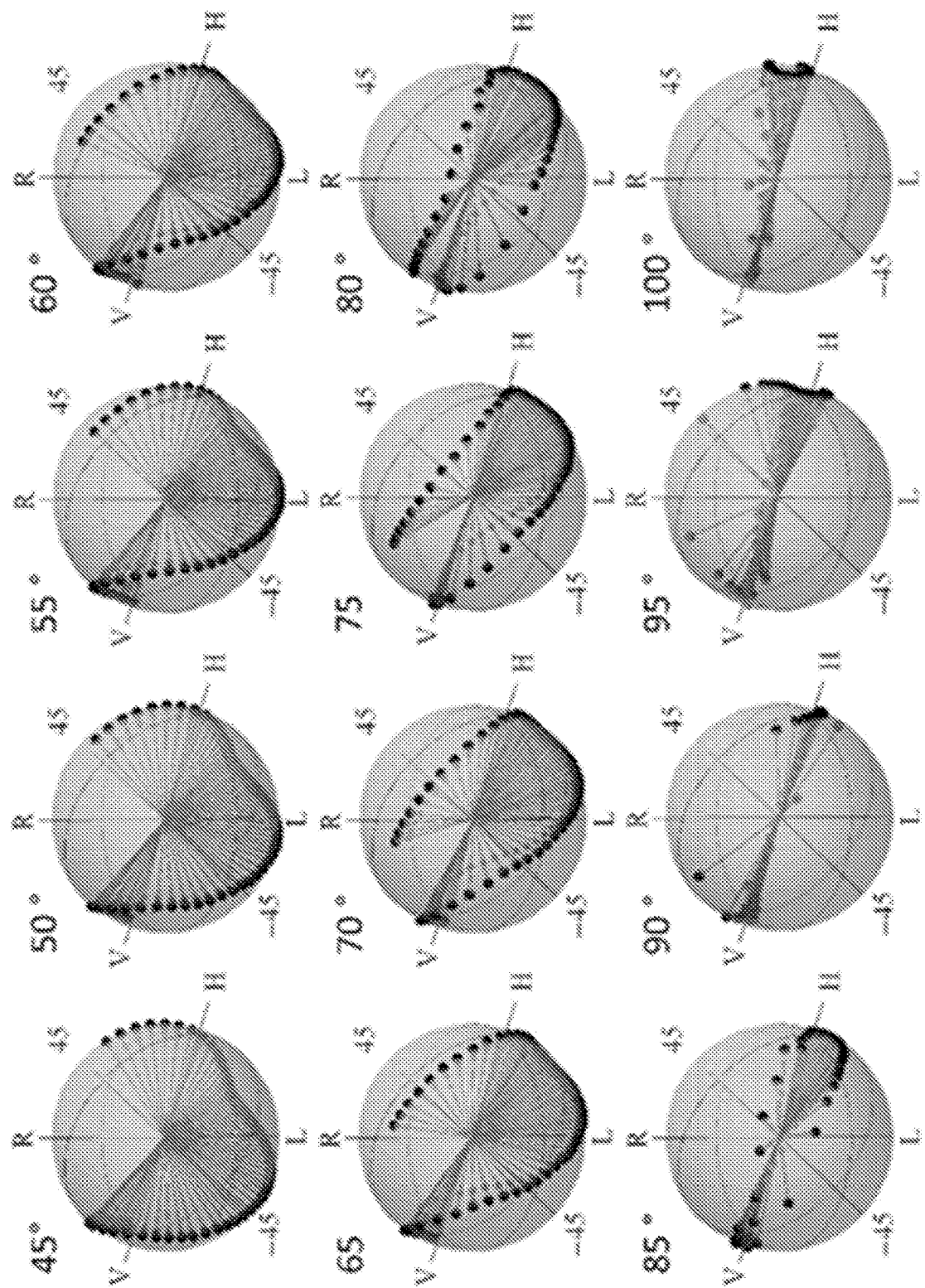
FIG. 14 shows wavelength dependent diattenuation of an RGB45-100 LCP filter over the Poincaré sphere.

FIG. 14 shows wavelength dependent diattenuation of the RGB configuration with θ ranging from 45° to 100° represented over the Poincaré sphere. The black dots show the orientation, while the lighter dots indicate magnitude. To achieve a larger diattenuation orientation dispersion, the black dots should be distributed around the equator as widely as possible. To achieve a larger magnitude of diattenuation, the lighter dots should be as far as possible from the center of the Poincaré sphere. RGB45-65 has a fairly good distribution with a larger magnitude of diattenuation. For RGB70-80, the magnitude of diattenuation decreases, and the diattenuation orientation tends to agglomerate on the opposite of the Poincaré sphere. For RGB85-100, the lighter dots pierce through the center of the Poincaré sphere, which represents the discontinuity of the diattenuation orientation. FIG. 14 provides an alternative view of the polarization signatures shown in FIGS. 6A-9B.

Representative CDP Applications

A compound dichroic polarizer (CDP) as described above is made of two or more layers of color polarizers having different angular orientations with respect to one another and color transmission characteristics. CDPs are thus made of component polarizers that are suitably arranged. CDPs can produce linear, circular or elliptical SOPs. In the embodiments discussed above, the polarizers are linear polarizers. Typical parameters of the CDP to be selected are: (1) the orientation axes of the component polarizers, (2) the transmission color bands of the component polarizers, (3) the thicknesses of the component polarizers, and (4) the stacking order of the component polarizers. The component polarizers can be layered on top of each other on the same substrate. Alternatively, the component polarizers can be deposited on separated substrates and mounted together to be fixed or on an adjustable mechanical mount, such that the relative orientations of the component polarizers can be changed. The CDP parameters are typically chosen to maximize the change of the diattenuation of light as a function of wavelength. As discussed above, diattenuation is the transmission property of a material that depends on the incident polarization state of the light. In contrast to conventional polarizers, which typically are achromatic, color neutral, and grey resulting in constant diattenuation as a function of wavelength, a CDP transmits light of different colors in different polarization states. CDP's as described above may be used as optical elements in various optical systems. A CDP may be used, for example, but without limitation, in the following applications.

Coatings for Sunglasses

In conventional polarized sunglasses, the color image is attenuated and looks natural for scene with polarization signatures. For sunglasses with one or two identical CDPs, the color image tends to looks unnatural. The color of objects in the image is shifted from the natural color of the objects because of the diattenuation of the CDPs. The unnatural color can be used to detect and discriminate polarization signatures of a scene. In principle, the CDP sunglasses allow a polarization blind person to see polarization. It can also allow a color blind person to see colors by mapping different colors to different intensities in cases where different colors have different polarization states.

Figure 15:
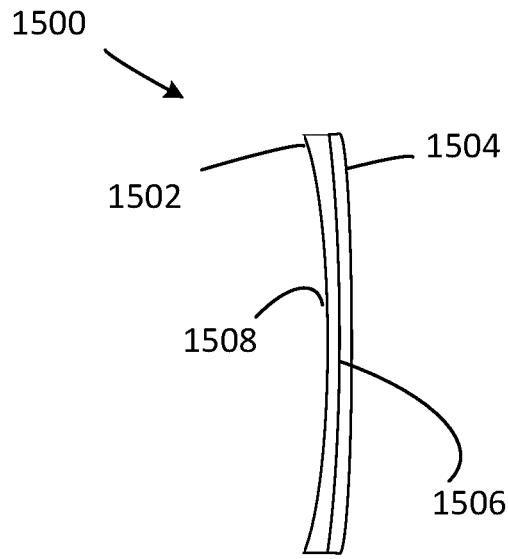
FIG. 15 illustrates a meniscus lens to which a CDP is secured.

A representative polarizing lens 1500 for use in eyewear is shown in FIG. 15 and includes a meniscus lens 1502 to which a CDP 1504 is secured. In the example of FIG. 15, the CDP 1504 is situated at a convex surface 1506 of the meniscus lens 1502, but in other examples the CDP 1504 is situated at the concave surface 1508. The meniscus lens 1502 can made of glass, plastic or other optical materials, and other lens shapes can be used such as plano-convex, double-convex, plano-concave, and double concave. In addition, lenses having multiple curvatures such bifocal or trifocal lenses or varifocal lenses can be provided with CDPs. CDPs can include portions on one or both lens surfaces.

Coatings for Cell Phones and Car Windows

Figure 16:
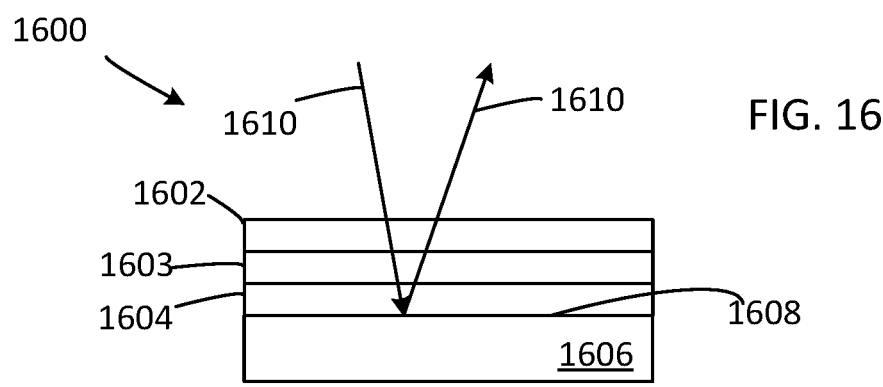
FIG. 16 illustrates a CDP secured to a reflective surface.

A CDP can be applied to a surface so as to act as a reflective polarization filter. Depending on the polarization and color of the illumination and the angle of view, the coated surface will appear to have different colors, which can be aesthetically desirable. Referring to FIG. 16, a reflective polarization filter 1600 includes CDP component layers 1602-1604 situated on a substrate 1606 having a reflective surface 1608. An input beam 1610 is directed to the layers 1602-1604 and is reflected at the surface 1608 so as to return through the layers 1602-1604 so that a color encoded polarized beam 1610 is produced.

Metrology

A CDP is a low cost solution to convert a polarization insensitive camera to a polarization sensitive camera. Objects, such as defects and stress structures, with different birefringence will appear in different colors using a combination of CDP and camera. In this example, a CDP can be secured to a camera lens, or otherwise situated to modulate optical radiation received by a camera.

Coatings for Security and Authentication

Figure 17:
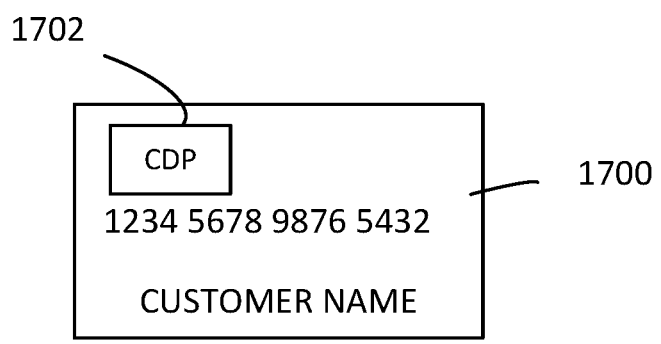
FIG. 17 illustrates a credit card with a CDP security region.

A CDP has unique, wavelength-dependent polarization properties which cannot be easily duplicated and thus can serve as an identifier for counterfeit prevention of document, credit card, identification card, and monetary notes. The dispersion of the polarization properties can convert polarization signatures into color coding in predesigned ways and be used as a unique security code. Referring to FIG. 17, a representative credit card 1700 includes a CDP 1702.

Additional Embodiments

A CDP for any of the above applications may be provided as shown in FIG. 2B, with a single substrate and eigenpolarizations of the individual polarizers that are fixed relative to each other so as to produce a fixed overall eigenpolarization of the CDP. Alternatively, in some examples, a CDP can be situated so as to be rotatable for tuning the eigenpolarization of the CDP relative to an input optical beam. In other examples, a rotational stage can be provided to vary a relative orientation of one or more component layers in a CDP.

Figure 18:
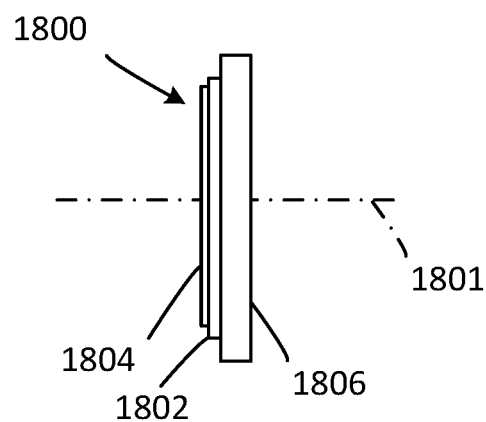
FIG. 18 illustrates a CDP in a rotatable mount.

FIG. 18 shows a CDP assembly 1800 that includes a CDP 1804 that is fixed to a rotatable mounting ring 1802. The mounting ring 1802 is coupled to a fixed support so as to be rotatable about an axis 1801.

Figure 19:
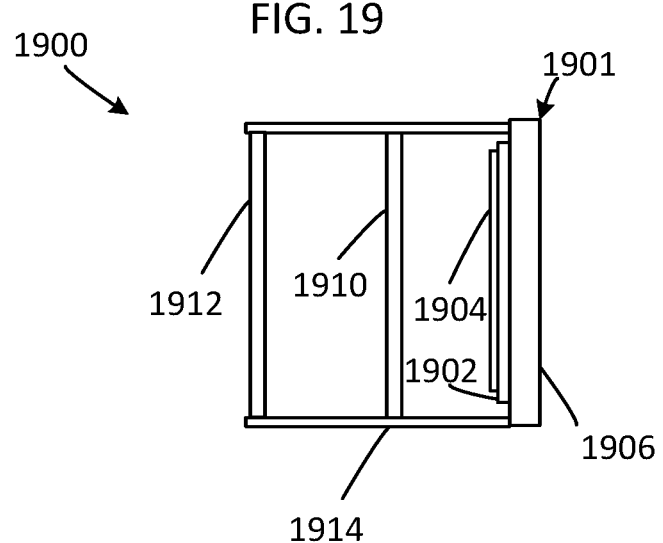
FIG. 19 illustrates a CDP having a rotatable component polarizer to permit CDP tuning.

Alternatively, in some optical systems it may be desirable to allow for tuning the individual eigenpolarizations of the individual component polarizers of a CDP. For that purpose a number of instances of the same mount shown in FIG. 18 can be used, where each of the mounts is used to capture an individual component polarizer. Referring to FIG. 19, a tunable CDP 1900 includes a rotational stage 1901 having a rotatable mounting ring 1902 that captures a component polarizer 1904. Additional component polarizers 1910, 1912 are secured to a mounting tube 1914.

It will be appreciated that CDPs and other associated polarization devices are described above based on representative implementations for use at visible wavelengths, and in some cases, based on a division of visible light into R, G, and B components. Such devices and systems can also be implemented for other wavelength ranges and with other spectral divisions. For example, CDPs can be fabricated for use at UV, IR, near IR, far IR or other wavelength ranges, and these wavelength ranges can be arbitrarily sub-divided as desired. In some cases, CDPs and other devices can be arranged to operate at wavelengths at one or more of UV, visible, IR, or other ranges. In one example, a security device includes a CDP operable at ultraviolet wavelengths. At such wavelength ranges, image sensors such as CCD, CMOS or other image sensors are situated to receive the CDP-encoded optical radiation. In some applications, one or more suitable individual radiation detectors can be used. This may be convenient at wavelength ranges in which detector arrays are either expensive or not readily available.

Mueller Matrix Calculations

The Mueller matrix is one of the principal methods for measuring and calculating polarization properties of an optical device. The matrix can be measured by using a Mueller matrix imaging polarimeter, and polarization properties, such as depolarization index, diattenuation, and retardance, can be computed from the Mueller matrix. Depolarization index refers to the degradation of the degree of polarization caused by the device. Diattenuation implies the variation of intensity attenuation as a function of the incident polarization state. Retardance is the phase difference between the eigenpolarizations. The four-by-four Mueller matrix is represented by:

$$M = \begin{pmatrix} M_{0,0} & M_{0,1} & M_{0,2} & M_{0,3} \\ M_{1,0} & M_{1,1} & M_{1,2} & M_{1,3} \\ M_{2,0} & M_{2,1} & M_{2,2} & M_{2,3} \\ M_{3,0} & M_{3,1} & M_{3,2} & M_{3,3} \end{pmatrix}, \quad (2)$$

wherein $M_{0,0}$ is the averaged transmittance over all incident polarization states. To derive depolarization index, diattenuation, and retardance, the Mueller matrix is decomposed by the Lu-Chipman decomposition as:

$$M = M_\Delta M_R M_D, \quad (3)$$

wherein $M_D$ is diattenuator Mueller matrix, $M_R$ is retarder Mueller matrix, and $M_\Delta$ is depolarizer Mueller matrix. Linear diattenuation (LD), circular diattenuation (CD), and diattenuation orientation (DO) can be obtained from diattenuator Mueller matrix $M_D$ as:

$$LD = \sqrt{\frac{M_{D,0,1}^2 + M_{D,0,2}^2}{M_{D,0,0}^2}}, \quad (4)$$

$$CD = \frac{M_{D,0,3}}{M_{D,0,0}}, \quad (5)$$

$$DO = \frac{\tan^{-1}\{M_{D,0,1}/M_{D,0,2}\}}{2}. \quad (6)$$

On the other hand, to rotate the optical device by angle $\theta$, the rotation matrix $R(\theta)$ can be applied to the Mueller matrix as:

$$M_\theta = R(\theta) \begin{pmatrix} M_{0,0} & M_{0,1} & M_{0,2} & M_{0,3} \\ M_{1,0} & M_{1,1} & M_{1,2} & M_{1,3} \\ M_{2,0} & M_{2,1} & M_{2,2} & M_{2,3} \\ M_{3,0} & M_{3,1} & M_{3,2} & M_{3,3} \end{pmatrix} R(-\theta), \quad (7)$$

wherein $M_\theta$ is the rotated Mueller matrix, and a rotation matrix $R(\theta)$ is:

$$R(\theta) = \begin{pmatrix} 1 & 0 & 0 & 0 \\ 0 & \cos(2\theta) & -\sin(2\theta) & 0 \\ 0 & \sin(2\theta) & \cos(2\theta) & 0 \\ 0 & 0 & 0 & 1 \end{pmatrix}.$$

We claim:

1. A polarization device, comprising:
a plurality of dichroic polarizers, wherein each of the dichroic polarizers has a single respective polarization axis, includes a respective dichroic dye that defines a diattenuation spectrum, each of the dichroic polarizers of the plurality of dichroic polarizers being situated along an axis and having different absorption spectra and different eigenpolarizations and arranged in series based on a change in diattenuation as a function of wavelength, wherein the plurality of dichroic polarizers includes three dichroic polarizers having respective peak transmittances mapped to corresponding colors and each of the three dichroic polarizers has a different absorption spectrum and a different set of two eigenpolarizations.

2. The polarization device of claim 1, further comprising at least one substrate, wherein the plurality of dichroic polarizers is secured to the at least one substrate.

3. The polarization device of claim 1, wherein each of the dichroic polarizers is secured to a respective substrate.

4. The polarization device of claim 1, wherein each of the dichroic polarizers of the plurality of dichroic polarizers includes a liquid crystal polymer layer, wherein the dye associated with each of the dichroic polarizers is aligned with respect to respective alignment directions of each of the liquid crystal polymer layers.

5. The polarization device of claim 1, wherein the plurality of dichroic polarizers includes three dichroic polarizers having peak transmittances associated with red, green, and blue, respectively.

6. The polarization device of claim 1, wherein the plurality of dichroic polarizers includes three dichroic polarizers having peak transmittances associated with cyan, magenta, and yellow, respectively.

7. The polarization device of claim 6, further comprising a meniscus lens, and the plurality of dichroic polarizers is secured to the meniscus lens.

8. The polarization device of claim 1, further comprising a meniscus lens, wherein the plurality of dichroic polarizers is secured to a concave surface of the meniscus lens.

9. The polarization device of claim 1, further comprising a meniscus lens, wherein the plurality of dichroic polarizers is secured to a convex surface of the meniscus lens.

10. The polarization device of claim 1, further comprising a multifocal meniscus lens, and the plurality of dichroic polarizers is secured the multifocal meniscus lens.

11. The polarization device of claim 1, further comprising a rotational stage coupled to at least one dichroic polarizer of the plurality of dichroic polarizers so that the at least one dichroic polarizer is rotatable about the axis.

12. The polarization device of claim 11, wherein the rotational stage is adapted to provide a common rotation to each of the dichroic polarizers of the plurality of polarizers.

13. The polarization device of claim 1, wherein at least one of the polarizers comprises a liquid crystal polymer material with a dichroic dye guest.

14. The polarization device of claim 1, wherein at least two of the polarizers comprise a liquid crystal polymer material with a dichroic dye guest, wherein the orientation of the dye molecules is substantially fixed by polymerization of the liquid crystal material.

15. The polarization device of claim 1, wherein the polarizers are linear polarizers.

16. The polarization device of claim 1, wherein the polarizers number at least three, one of which comprises G-207 (415 nm) dichroic dye, another of which comprises G-241 (580 nm) dichroic dye, and the third of which comprises G-472 (640 nm) dichroic dye.

17. A method, comprising:
positioning a plurality of dichroic polarizers in series so as to receive an input optical beam, wherein each of the dichroic polarizers has a different nominal absorption spectra and a different set of two eigenpolarizations and arranged based on a change in diattenuation as a function of wavelength, wherein the plurality of dichroic polarizers includes three dichroic polarizers having respective peak transmittances mapped to corresponding colors; and directing an input optical beam to the plurality of dichroic polarizers to produce an output optical beam so that a power spectral distribution of the output optical beam is representative of at least one state of polarization of the input optical beam.

18. The method of claim 17, wherein linear polarization angles between the dichroic polarizers are selected so as to achieve a maximum variation of diattenuation with wavelength.

19. The method of claim 17, further comprising situating at least one of the dichroic polarizers to be rotatable so that the at least one associated eigenpolarization is adjustable, and adjusting the at least one associated eigenpolarization based on a mapping of states of polarization to colors.

20. The method of claim 17, wherein the linear polarization angles between the dichroic polarizers are selected so as to achieve a desired mapping of states of polarization to colors.

21. A method for constructing a device for converting states of polarization of light into color coding, comprising:
   preparing a plurality of dichroic polarizers, each having a different absorption spectra; and
   arranging the plurality of dichroic polarizers in series based on a change in diattenuation as a function of wavelength so that light can pass serially therethrough, the dichroic polarizers having respective axes that are oriented so as to establish eigenpolarizations oriented differently from one another such that different polarization states are mapped to corresponding colors, wherein the plurality of dichroic polarizers includes three dichroic polarizers each having respective peak transmittances mapped to corresponding colors and a different set of two eigenpolarizations.

22. The method of claim 21, further comprising situating at least one of the dichroic polarizers in a rotational mount so as to vary an associated eigenpolarization orientation.

23. The method of claim 21, further comprising:
   directing a light beam to the prepared plurality of polarizers;
   producing an image optical beam with the plurality of dichroic polarizers;
   detecting the image optical beam with a color image sensor;
   storing a representation of the detected image optical beam in a memory device; and
   obtaining state of polarization (SOP) data associated with the image optical beam.

24. The method of claim 21, further comprising:
   preparing the plurality of dichroic polarizers by mixing one of a plurality of different dyes with a respective quantity of liquid crystal material;
   aligning the respective liquid crystal molecules in the respective mixtures; and
   illuminating the aligned respective mixtures with polymerizing light so as to fix the orientation of the respective liquid crystal molecules and the respective dye molecules.

\* \* \* \* \*